US012532880B2

(12) United States Patent
Eskandari et al.

(10) Patent No.: US 12,532,880 B2
(45) Date of Patent: Jan. 27, 2026

(54) CRYOPRESERVATION OF CELL MONOLAYERS

(71) Applicant: Janet Anne Wade Elliott, Edmonton (CA)

(72) Inventors: Nasim Eskandari, Edmonton (CA); Janet Anne Wade Elliott, Edmonton (CA); Locksley E. McGann, Edmonton (CA); John A. Nychka, Edmonton (CA); Leah A. Marquez-Curtis, Edmonton (CA)

(73) Assignee: Janet Anne Wade Elliott, Edmonton (CA)

( * ) Notice: Subject to any disclaimer, the term of this patent is extended or adjusted under 35 U.S.C. 154(b) by 1064 days.

(21) Appl. No.: 17/269,987

(22) PCT Filed: Aug. 21, 2019

(86) PCT No.: PCT/CA2019/051144
§ 371 (c)(1),
(2) Date: Feb. 19, 2021

(87) PCT Pub. No.: WO2020/037416
PCT Pub. Date: Feb. 27, 2020

(65) Prior Publication Data
US 2021/0345600 A1  Nov. 11, 2021

Related U.S. Application Data

(60) Provisional application No. 62/721,219, filed on Aug. 22, 2018.

(51) Int. Cl.
*A01N 1/125* (2025.01)
*C12N 5/071* (2010.01)

(52) U.S. Cl.
CPC .............. *A01N 1/125* (2025.01); *C12N 5/069* (2013.01)

(58) Field of Classification Search
None
See application file for complete search history.

(56) References Cited

U.S. PATENT DOCUMENTS 6,596,531 B2 *  7/2003  Campbell ............ A01N 1/0205
                                                       435/395

FOREIGN PATENT DOCUMENTS

EP     2702135 B1    4/2019
WO  2012/149484 A2   1/2012

OTHER PUBLICATIONS

Ebertz et al, Cryobiology, 2004, 49:37-44. (Year: 2004).*
Campbell, LH, Brockbank KGM. "Cryopreservation of Adherent Cells on a Fixed Substrate." Recent Advances in Cryopreservation, edited by Yamashiro H, IntechOpen, 2014. (Year: 2014).*
Biological Industries, "CryoStem" Production information sheet. v4 Jul. 2016. Retrieved from URL: https://www.cellseco.com/wp-content/uploads/2018/02/CryoStem%E2%84%A2-Freezing-Medium-Instructions-for-Use.pdf (Year: 2016).*
ASM International. (1995). <i>Engineered Materials Handbook®—Desk Edition.</i> ASM International. Retrieved from <br>https://app.knovel.com/hotlink/toc/id:kpEMHDE004/engineered-materials/engineered-materials (Year: 1995).*
Eskandari, N., et al., Cryopreservation of Human Umbilical Vein and Porcine Corneal Endothelial Cell Monolayers, Cryobiology 85:63-72, Dec. 2018.
International Search Report and Written Opinion mailed Oct. 25, 2019, issued in corresponding Application No. PCT/CA2019/051144, filed Aug. 21, 2019, 15 pages.
P. K. Thalla, H. Fadlallah, B. Liberelle, P. Lequoy, G. De Crescenzo, Y. Merhi, S. Lerouge, Chondroitin sulfate coatings display low platelet but high endothelial cell adhesive properties favorable for vascular implants, Biomacromolecules. 15 (2014) 2512-2520.
M. Zhurova, E. J. Woods, J. P. Acker, Intracellular ice formation in confluent monolayers of human dental stem cells and membrane damage, Cryobiology. 61 (2011) 133-141.
N. Rescignano et al. Polymer Degradation and Stability 108 (2014) 280-287.
P. Mazur, Cryobiology: The freezing of biological systems, Science. 168 (1970) 939-949. doi:10.1126/science.168.3934.939.
L. E. McGann, M. L. Walterson, Cryoprotection by dimethyl sulfoxide and dimethyl sulfone, Cryobiology. 24 (1987) 11-16. doi: 10.1016/0011-2240(87)90003-4.
F. E. De Leeuw, A. M. De Leeuw, J. H. Den Daas, B. Colenbrander, A. J. Verkleij, Effects of various cryoprotective agents and membrane-stabilizing compounds on bull sperm membrane integrity after cooling and freezing., Cryobiology. 30 (1993) 32-44. doi: 10.1006/cryo.1993.1005.

(Continued)

*Primary Examiner* — Allison M Fox
(74) *Attorney, Agent, or Firm* — CHRISTENSEN O'CONNOR JOHNSON KINDNESS PLLC

(57) ABSTRACT

Cryopreservation of endothelial cell monolayers is one of the major challenges in the cryopreservation of complex tissues. Human umbilical vein endothelial cells (HUVECs) in suspension are available commercially and recently their post-thaw cell membrane integrity was significantly improved by cryopreservation in 5% dimethyl sulfoxide (DMSO) and 6% hydroxyethyl starch (HES). However, cryopreservation of cells in monolayers has been elusive. The exact mechanisms of damage during cell monolayer cryopreservation are still under investigation. Here, we show that a combination of different factors contribute to significant progress in cryopreservation of cell monolayers. The addition of 2% chondroitin sulfate to 5% DMSO and 6% HES and cooling at 0.2 or 1° C./min led to high membrane integrity (97.3±3.2%) immediately after thaw when HUVECs were cultured on a substrate with a coefficient of thermal expansion similar to that of ice. The optimized cryopreservation protocol was applied to monolayers of primary porcine corneal endothelial cells, and resulted in high post-thaw viability (95.9±3.7% membrane integrity) with metabolic activity 12 hours post-thaw comparable to unfrozen control.

30 Claims, 9 Drawing Sheets

(56) References Cited

OTHER PUBLICATIONS

J. F. Carpenter, J. H. Crowe, The mechanism of cryoprotection of proteins by solutes, Cryobiology. 25 (1988) 244-255. doi:10.1016/0011-2240(88)90032-6.
P. Mazur, The role of intracellular freezing in the death of cells cooled at supraoptimal rates., Cryobiology. 14 (1977) 251-272. doi:10.1016/0011-2240(77)90175-4.
P. Mazur, W. F. Rall, S. P. Leibo, Kinetics of water loss and the likelihood of intracellular freezing in mouse ova—Influence of the method of calculating the temperature dependence of water permeability, Cell Biophys. 6 (1984) 197-213. doi:10.1007/BF02788619.
B. Liu, J. McGrath, Freezing osteoblast cells attached to hydroxyapatite discs and glass coverslips: Mechanisms of damage, Sci. China, Ser. E Technol. Sci. 50 (2007) 248-256. doi:10.1007/s11431-007-0021-5.
D. E. Pegg, M. P. Diaper, On the mechanism of injury to slowly frozen erythrocytes, Biophys. J. 54 (1988) 471-488. doi:10.1016/s0006-3495(88)82980-1.
Toner M., Cravalho E. G., Karel M. Thermodynamics and kinetics of intracellular ice formation during freezing of biological cells. J. Appl. Phys. 67(1990) 1582-1593.
J. Y. Lai, Corneal stromal cell growth on gelatin/chondroitin sulfate scaffolds modified at different NHS/EDC molar ratios, Int. J. Mol. Sci. 14 (2013) 2036-2055. doi:10.3390/ijms14012036.
S. Proulx, J.-M. Bourget, N. Gagnon, S. Martel, A. Deschambeault, P. Carrier, C. J. Giasson, F. A. Auger, I. Brunette, L. Germain, Optimization of culture conditions for porcine corneal endothelial cells., Mol. Vis. 13 (2007) 524-533.
B. Y. J. T. Yue, J. Sugar, J. E. Gilboy, J. L. Elvarr, Growth of human corneal endothelial cells in vitro., Invest. Ophthalmol. Vis. Sci. 30 (1989) 248-253.
Mishra, M. and Y. Yagci (2016). Handbook of Vinyl Polymers: Radical Polymerization, Process, and Technology, Second Edition, CRC Press; Chapter 17: Vinyl Polymers Applications and Special Uses, pp. 541-598.
Zhong Xun Khoo, Joanne Ee Mei Teoh, Yong Liu, Chee Kai Chua, Shoufeng Yang, Jia An, Kah Fai Leong & Wai Yee Yeong (2015) 3D printing of smart materials: A review on recent progresses in 4D printing, Virtual and Physical Prototyping, 10:3, 103-122, DOI: 10.1080/17452759.2015.1097054.
Jae Kwan Kim et al. 2012 Nanotechnology 23 235303.
X. Miao et al. Acta Biomaterialia 4 (2008) 638-645.
J. P. Acker, J. A. W. Elliott, L. E. McGann, Intercellular ice propagation: experimental evidence for ice growth through membrane pores, Biophys J. 81 (2001) 1389-1397.
J. P. Acker, A. Larese, H. Yang, A. Petrenko, L. E. McGann, Intracellular ice formation is affected by cell interactions, Cryobiology. 38 (1999) 363-371.
J. P. Acker, L. E. McGann, Protective effect of intracellular ice during freezing?, Cryobiology. 46 (2003) 197-202.
J. Armitage, Cryopreservation for corneal storage, Dev Ophthalmol. 43 (2009) 63-69.
W. J. Armitage, B. K. Juss, The influence of cooling rate on survival of frozen cells differs in monolayers and in suspensions, Cryo-Letters. 17 (1996) 213-218.
A. Asari, S. Miyauchi, T. Takahashi, K. Kohno, Y. Uchiyama, Localization of hyaluronic acid, chondroitin sulfate, and CD44 in rabbit cornea, Arch Histol Cytol. 55 (1992) 503-511.
J. Bakhach, The cryopreservation of composite tissues: Principles and recent advancement on cryopreservation of different type of tissues, Organogenesis. 5 (2009) 119-126.
F. Cavalieri et al. Biomacromolecules, 2004, 5, 2439-2446.
J. M. Baust, R. V. A. N. Buskirk, J. G. Baust, Cell viability improves following inhibition of cryopreservation-induced apoptosis, Vitr Cell Dev Biol—Anim. 36 (2000) 262-270.
J. Birraux, B. Genin, D. Matthey-Doret, R. Mage, P. Morel, C. Le Coultre, Hepatocyte cryopreservation in a three-dimensional structure, Transplant Proc. 34 (2002) 764-767.

K. G. M. Brockbank, Effects of cryopreservation upon vein function in vivo, Cryobiology. 31 (1994) 71-81.
H. E. Broxmeyer, E. F. Srour, G. Hangoc, S. Cooper, S. A. Anderson, D. M. Bodine, High-efficiency recovery of functional hematopoietic progenitor and stem cells from human cord blood cryopreserved for 15 years, Proc Natl Acad Sci. 100 (2003) 645-650.
P. F. Costa, A. F. Dias, R. L. Reis, M. E. Gomes, Cryopreservation of cell/scaffold tissue-engineered constructs, Tissue Eng Part C Methods. 18 (2012) 852-858.
S. L. Ebertz, L. E. McGann, Cryoinjury in endothelial cell monolayers, Cryobiology. 49 (2004) 37-44.
N. Eskandari, Developing a cryopreservation protocol for human umbilical vein endothelial cells (HUVECs) in monolayers. MSc Thesis, 2017.
W. X. Fan, X. H. Ma, D. Ge, T. Q. Liu, Z. F. Cui, Cryoprotectants for the vitrification of corneal endothelial cells, Cryobiology. 58 (2009) 28-36.
V. Gouliarmou, O. Pelkonen, S. Coecke, Differentiation-promoting medium additives for hepatocyte cultivation and cryopreservation, Methods Mol Biol. 1250 (2015) 143-159.
M. Griffith, E. I. Alarcon, I. Brunette, Regenerative approaches for the cornea, J Intern Med. 12502 (2016) 1-11.
M. Hagenah, M. Bohnke, Corneal cryopreservation with chondroitin sulfate, Cryobiology. 30 (1993) 396-406.
M. Hagenah, M. Böhnke, Latent endothelial cell damage after experimental corneal cryopreservation, Graefe's Arch Clin Exp Ophthalmol. 231 (1993) 529-532.
T. H. Jang, S. C. Park, J. H. Yang, J. Y. Kim, J. H. Seok, U. S. Park, C. W. Choi, S. R. Lee, J. Han, Cryopreservation and its clinical applications, Integr Med Res. 6 (2017) 12-18.
N. M. Jomha, J. A. W. Elliott, G. K. Law, B. Maghdoori, J. F. Forbes, A. Abazari, A. B. Adesida, L. Laouar, X. Zhou, L. E. McGann, Vitrification of intact human articular cartilage, Biomaterials. 33 (2012) 6061-8.
H. Kim, S. Tanaka, S. Une, M. Nakaichi, S. Sumida, Y. Taura, A comparative study of the effects of glycerol and hydroxyethyl starch in canine red blood cell cryopreservation, J Vet Med Sci. 66 (2004) 1133-1134.
H. G. Koebe, J. C. Y. Dunn, M. Toner, L. M. Sterling, A. Hubei, E. G. Cravalho, M. L. Yarmush, R. G. Tompkins, A new approach to the cryopreservation of hepatocytes in a sandwich culture configuration, Cryobiology. 27 (1990) 576-584.
M. Kubo, K. Ando, T. Mimura, Y. Matsusue, K. Mori, Chondroitin sulfate for the treatment of hip and knee osteoarthritis: Current status and future trends, Life Sci. 85 (2009) 477-483.
L. Lecchi, S. Giovanelli, B. Gagliardi, I. Pezzali, I. Ratti, M. Marconi, An update on methods for cryopreservation and thawing of hemopoietic stem cells, Transfus Apher Sci. 54 (2016) 324-336.
K. Lehle, M. Hoenicka, V. R. Jacobs, F. X. Schmid, D. E. Birnbaum, Cryopreservation of human endothelial cells for vascular tissue engineering, Cryobiology. 50 (2005) 154-161.
H. Levis, A. Kureshi, I. Massie, L. Morgan, A. Vernon, J. Daniels, Tissue engineering the cornea: The evolution of RAFT, J Funct Biomater. 6 (2015) 50-65.
B. L. Liu, J. McGrath, L. McCabe, M. Baumann, Cellular response of murine osteoblasts to cryopreservation: the influence of attachment to hydroxyapatite (HA) scaffolds, African J Biotechnol. 5 (2006) 2014-2019.
P. W. Madden, M. J. Taylor, C. J. Hunt, D. E. Pegg, The effect of polyvinylpyrrolidone and the cooling rate during corneal cryopreservation, Cryobiology. 30 (1993) 135-157.
L. A. Marquez-Curtis, A. Janowska-Wieczorek, L. E. McGann, J. A. W. Elliott, Mesenchymal stromal cells derived from various tissues: Biological, clinical and cryopreservation aspects, Cryobiology. 71 (2015) 181-197.
L. A. Marquez-Curtis, L. E. McGann, J. A. W. Elliott, Expansion and cryopreservation of porcine and human corneal endothelial cells, Cryobiology. 77 (2017) 1-13.
J. Martel-Pelletier, S. Kwan Tat, J. P. Pelletier, Effects of chondroitin sulfate in the pathophysiology of the osteoarthritic joint: a narrative review, Osteoarthr Cartil. 18 (2010) S7-S11.
M. Maruyama, T. Kenmochi, K. Sakamoto, S. Arita, C. Iwashita, H. Kashiwabara, Simplified method for cryopreservation of islets using

(56) References Cited

OTHER PUBLICATIONS hydroxyethyl starch and dimethyl sulfoxide as cryoprotectants, in: Transplant Proc, 2004: pp. 1133-1134.

P. Mazur, Freezing of living cells: mechanisms and implications, Am J Physiol. 247 (1984) C125-C142.

P. Mazur, S. P. Leibo, E. H. Chu, A two-factor hypothesis of freezing injury. Evidence from Chinese hamster tissue-culture cells, Exp Cell Res. 71 (1972) 345-55.

L. E. McGann, Optimal temperature ranges for control of cooling rate, Cryobiology. 16 (1979) 211-216.

D. F. McGinnity, M. G. Soars, R. A. Urbanowicz, R. J. Riley, Evaluation of fresh and cryopreserved hepatocytes as in vitro drug metabolism tools for the prediction of metabolic clearance, Drug Metab Dispos. 32 (2004) 1247-1253.

Y. Miyamoto, S. Enosawa, T. Takeuchi, T. Takezawa, Cryopreservation in situ of cell monolayers on collagen vitrigel membrane culture substrata: Ready-to-use preparation of primary hepatocytes and ES cells, Cell Transplant. 18 (2009) 619-626.

Y. Naaldijk, M. Staude, V. Fedorova, A. Stolzing, Effect of different freezing rates during cryopreservation of rat mesenchymal stem cells using combinations of hydroxyethyl starch and dimethylsulfoxide, BioMed Cent Biotechnol. 12 (2012) 1-10.

D. E. Pegg, Viability assays for preserved cells, tissues, and organs, CryoLetters. 26 (1989) 212-231.

D. E. Pegg, Cryopreservation of vascular endothelial cells as isolated cells and as monolayers, Cryobiology. 44 (2002) 46-53.

S. J. Rogerson, S. C. Chaiyaroj, K. Ng, J. C. Reeder, G. V Brown, Chondroitin sulfate A is a cell surface receptor for Plasmodium falciparum-infected erythrocytes, J Exp Med. 182 (1995) 15-20.

L. U. Ross-Rodriguez, J. A. W. Elliott, L. E. McGann, Investigating cryoinjury using simulations and experiments: 2. TF-1 cells during graded freezing (interrupted slow cooling without hold time), Cryobiology. 61 (2010) 46-51.

C. Routledge, W. J. Armitage, Cryopreservation of cornea: a low cooling rate improves functional survival of endothelium after freezing and thawing, Cryobiology. 46 (2003) 277-283.

T. Rutt, N. Eskandari, M. Zhurova, J. A. W. Elliott, L. E. McGann, J. P. Acker, J. A. Nychka, Thermal expansion of substrate may affect adhesion of Chinese hamster fibroblasts to surfaces during freezing, Cryobiology. 86 (2019) 134-139.

R. Servaty, J. Schiller, H. Binder, K. Arnold, Hydration of polymeric components of cartilage—An infrared spectroscopic study on hyaluronic acid and chondroitin sulfate, Int J Biol Macromol. 28 (2001) 121-127.

P. J. Stiff, M. F. DeRisi, A. Langleben, S. Gulati, A. Koester, V. Lanzotti, B. D. Clarksont, Autologous bone marrow transplantation using unfractionated cells without rate-controlled freezing in hydroxyethyl starch and dimethyl sulfoxide, Ann N Y Acad Sci. 411 (1983) 378-380.

A. Stolzing, Y. Naaldijk, V. Fedorova S. Sethe, Hydroxyethylstarch in cryopreservation—Mechanisms, benefits and problems, Transfus Apher Sci. 46 (2012) 137-147.

A. B. Sultani, L. A. Marquez-Curtis, J. A. W. Elliott, L. E. McGann, Improved cryopreservation of human umbilical vein endothelial cells: A systematic approach, Sci Rep. 6 (2016) 1-14.

* cited by examiner

CRYOPRESERVATION OF CELL MONOLAYERS

TECHNICAL FIELD

Cryopreservation of Cell Monolayers

BACKGROUND

Cryopreservation is an established method for long-term storage of living cells in the presence of cryoprotective agents (CPAs) at temperatures as low as that of liquid nitrogen (−196° C.) [35]. It is the only available method to ensure off-the-shelf availability of mammalian cells for transplantation [26], medical research [21], and tissue-engineered constructs [13]. Many cells in suspension have been successfully cryopreserved for decades [12,27,31,38], but advances in cryopreservation of isolated cells continue to be made [17,26,32,50]. Cryopreservation of cells in suspension is typically carried out with the addition of a penetrating CPA (the most commonly used being dimethyl sulfoxide (DMSO)) and fetal bovine serum (FBS), sometimes in combination with a non-penetrating CPA such as hydroxyethyl starch (HES) [23,32,34,40,48,50]. This is followed by ice nucleation, slow cooling, storage in liquid nitrogen and rapid thaw. Cryopreservation of two-dimensional structures (cells in monolayers) is far more challenging than cryopreservation of isolated cells in suspension. The increasing importance of monolayers in tissue-engineered constructs and in transplantation has led to a need to develop protocols for successful cryopreservation of cells in monolayers. For example, because of the global shortage of donor corneas, recent approaches involve the use of tissue-engineered corneal implants that employ endothelial monolayers [18,28]. The complexity of monolayer cryopreservation arises from the cell configuration [2,7]. The presence of intercellular junctions and cell-surface interactions in monolayers increase the prevalence of intracellular ice formation compared to isolated cells [1,2]. It is proposed that ice propagates through cell-cell junctions [1]. Although intracellular ice formation is lethal in isolated cells in suspension, it may confer protection in monolayers during slow cooling as it prevents osmotic volume change [3].

One of the factors which influences the efficacy of cryopreservation is cooling rate. Depending on the rate of cooling, cells may experience two different kinds of damage [36]. Slow cooling (typically 1° C./min for most mammalian cells) causes cell dehydration, whereas rapid cooling leads to intracellular ice formation. Graded freezing (interrupted slow cooling) is a protocol that is used to delineate between progressive damage during slow cooling to an interruption temperature, from damage upon rapid cooling from that temperature to the storage temperature (typically −196° C.) [37,44]. Investigations regarding the relationship between cooling rate and cell survival revealed that cells in monolayers have a higher tolerance to slow cooling compared with cells in suspension [42,45]. Studies on cryopreservation of the human endothelial cell line ECV304 in monolayers [42] and rabbit cornea [45] suggested that a cooling rate lower than 1° C./min is beneficial for functional survival of the endothelial layer after cryopreservation. It has been proposed that a lower cooling rate minimizes the injury from intracellular ice formation [30].

Modification of the cryopreservation solution by addition of a non-penetrating CPA such as hydroxyethyl starch (HES) to a solution containing penetrating CPAs reduces the chance of intracellular ice formation by increasing cell dehydration early in the freezing process [49]. Moreover, HES stabilizes the cell membrane and increases viscosity by binding to water molecules in the extracellular environment [49]. Of particular interest to the current study, cryopreservation of human umbilical vein endothelial cells (HUVECs) in suspension in the presence of 5% DMSO and 6% HES resulted in cells with higher membrane integrity compared with 10% DMSO as the only CPA [50]. Chondroitin sulfate (CS) is a sulfated glycosaminoglycan with high water retention capacity that is an important component of cartilage [25,33] and the cornea [6]. It has shown beneficial effect for growth and adhesion of HUVECs to a surface [51]. Addition of CS to cryopreservation solutions resulted in improved cell recovery in tissues including cornea [19,20], vein [11] and articular cartilage [22].

Detachment of rabbit corneal endothelial cells from the Descemet's membrane [30] and human corneal endothelial cells from the substrate following cryopreservation [14] has been reported. Significant detachment has also been observed in cryopreservation of dental pulp stem cells in monolayers [52]. Although the mechanism of detachment is not clear, it occurs during freezing and/or thawing processes and limits the ability to cryopreserve intact monolayers. To reduce cell loss due to detachment, some cryopreservation protocols for monolayers have resorted to surface modification. Surface properties of the substrate on which cells are cultured play an important role in viability and attachment of the cells. Cryopreservation of primary rat hepatocytes on a collagen vitrigel membrane improved cell attachment after thawing (31%) compared with cells cryopreserved on a plastic culture dish (0%) [39]. Entrapment of monolayers within gels has been attempted for certain cell types, mainly hepatocytes which have shown higher viability compared with isolated cells in suspension [24]; however, only a minority of cells were functional after cryopreservation which would not be useful in a clinical setting [10]. The loss of cells due to detachment immediately after cryopreservation is a serious problem for cryopreservation of some cell monolayers such as endothelial cells [14] and osteoblasts [29]. Thermal modulation during cryopreservation is one of the factors which could affect cell-surface interactions [29]. It was previously assumed that the difference in coefficient of thermal expansion between cells and the underlying matrix is a possible reason for cell detachment [29]. During cryopreservation of monolayers, ice forms primarily in the extracellular environment. Therefore, the extracellular environment and substrate both experience contraction and expansion during cryopreservation. In a preliminary study by our group to be published concurrently, it was hypothesized that by using a substrate material (Rinzl™) with a coefficient of thermal expansion similar to that of ice, cell detachment due to mismatch in contraction/expansion during cooling and warming processes could be reduced [46]. Rinzl™ coverslips are made from optically clear, non-autofluorescent vinyl plastic [53]. A lower cell detachment of Chinese hamster fibroblasts after freezing at −9° C. was observed from Rinzl™ coverslips compared to glass [46]. The preliminary study did not consider a cryopreservation protocol expected to allow cell recovery and did not assess post-thaw viability.

SUMMARY

There is provided a method for cryopreservation of cells in an aqueous medium, wherein the cells are adhered to a substrate, comprising cooling the cells in the presence of a cryopreservative to freeze the medium and convert water to ice, the ice having a coefficient of thermal expansion, wherein the substrate has a coefficient of thermal expansion that sufficiently matches the coefficient of thermal expansion of ice that damage to the cells is avoided.

In various embodiments, there may be included any one or more of the following features: the cells comprise adherent cells (most cell types are adherent and grow attached to other cells or a substrate; generally cells that come from tissue are adherent); the cells comprise endothelial cells; the cells comprise corneal endothelial cells; the cells comprise human umbilical vein endothelial cells (HUVEC); the cells comprise human cerebral microvascular endothelial cells; the cells comprise vascular cells; the cells comprise one of fibroblasts, epithelial cells, mesenchymal stromal cells, stem cells, hepatocytes, osteoblasts, muscle cells, cardiomyocytes, glial cells, neuronal cells, cells from tissue, cells from islets of Langerhans, testicular cells, ovarian cells, and cells in organoids; the cells are comprised of a single cell type or multiple cells types; the coefficient of thermal expansion is between $5\times10^{-6}$/K and $500\times10^{6}$/K; the coefficient of thermal expansion is between $10\times10^{-6}$/K and $500\times10^{6}$/K; the cells are cooled at a rate between 0.2° C./min and 3° C./min; the cells are cooled at a rate between 0.2° C./min and 1° C./min; the cells are cooled at a rate between 0.2° C./min and 5° C./min; the substrate comprises a glass; the substrate comprises a plastic; the substrate comprises a polymer; the substrate comprises vinyl polymer; the substrate is Rinzl™; the substrate comprises one or more of polystyrene, polytetrafluoroethylene, polymethylmethacrylate, acrylic, polylactic acid, polylactide, polyethylene naphthalate, PCTG, PCTA, polyallyldiglycol carbonate, polycarbonate, polycarbonate+polybutylene terephthalate, polyethylene terephthalate, polyethylene terephthalate glycol, polycarbonate+polyester, polydimethyl siloxane, vinylmethyl silicone, perfluoropolyethers, poly (ethylene glycol) diacrylate, thermoset polyester, cellulose acetate butyrate, polypropylene flame retarded, polypropylene impact copolymer UV stabilized, thermoplastic vulcanizate, thermoplastic elastomer ether-ester, thermoplastic polyurethane elastomer, cyclic olefin copolymer COP, cyclic olefin copolymer COC, methylmethacrylate acrylonitrile butadiene styrene, polymethylpentene, polyethersulfone, polyphenylsulfone, acrylonitrile methyl acrylate copolymer, polyether block amide, thermoplastic amide, ethylene vinyl acetate, polyvinyl butyral, polyvinylchloride elastomer, styrene butadiene styrene block copolymer, PLGA polylactic-co-glycolic acid, PVA-MA poly (vinyl alcohol)-methacrylate; the cells are in a single layer; all cells contact the substrate; some cells are in contact with the substrate and other cells are in contact with those cells; the cryopreservative includes a permeating cryoprotectant; the permeating cryoprotectant is dimethyl sulfoxide (DMSO); the permeating cryoprotectant is selected from the group of glycerol, propylene glycol, ethylene glycol, formamide, ethanol and methanol; the permeating cryoprotectant is a combination of permeating cryoprotectants; the cryopreservative includes a non-permeating cryoprotectant; the non-permeating cryoprotectant is hydroxyethyl starch (HES); the non-permeating cryoprotectant is selected from the group of sugars, starches, proteins, serum, plasma or other macromolecules; the non-permeating cryoprotectant is a combination of non-permeating cryoprotectants; the cryopreservative includes chondroitin sulfate (CS); the cryopreservative comprises DMSO, HES and CS; the cryopreservative comprises 5% DMSO, 6% HES and 2% CS by weight; the aqueous solution comprises a growth medium; the aqueous solution comprises an aqueous buffer including but not limited to phosphate-buffered saline, Hank's balanced salt solution or HEPES; the cells comprise human cerebral microvascular endothelial cells; the substrate is coated with fibronectin; the substrate is coated with collagen, laminin or another cell-attachment enhancing component.

These and other aspects of the device and method are set out in the claims.

BRIEF DESCRIPTION OF THE FIGURES

Embodiments will now be described with reference to the figures, in which like reference characters denote like elements, by way of example, and in which:

In FIG. 6A, (i) is immediately after thaw (PBS), 0.2° C./min, (ii) is next day (PBS), 0.2° C./min, (iii) is next day (SD), 0.2° C./min, (iv) is immediately after thaw (PBS), 1° C./min, (v) is next day (PBS), 1° C./min, (vi) is next day (SD), 1° C./min. In FIG. 6B, (i) is an unfrozen control, (ii) is next day (PBS), 0.2° C./min, (iii) is next day (SD), 0.2° C./min, (iv) is next day (PBS), 1° C./min, (v) is next day (SD), 1° C./min.

DETAILED DESCRIPTION

Figure 1:
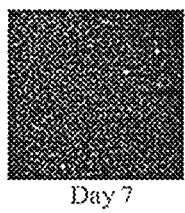
FIG. 1 is a schematic overview of graded freezing and thawing. HUVEC monolayers were cultured on fibronectin-coated glass or Rinzl™ coverslips. Nuclear staining was carried out using SYTO 13/GelRed™. Coverslips in glass vials with 190 μl of cryoprotectant solution were equilibrated at the ice nucleation temperature in a methanol bath. Ice was nucleated with pre-cooled forceps and cell-covered coverslips were placed back into the methanol bath and cooled to the interruption temperatures. For each experimental temperature, two coverslips were used. One was directly thawed (upward arrows) in a water bath at 37° C. and the other was plunged into liquid nitrogen and at the end of the experiments was thawed (downward arrows) in a water bath at 37° C.
Figure 1:
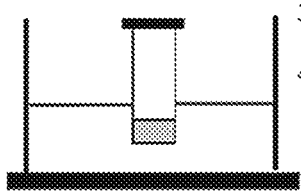
Figure 1:
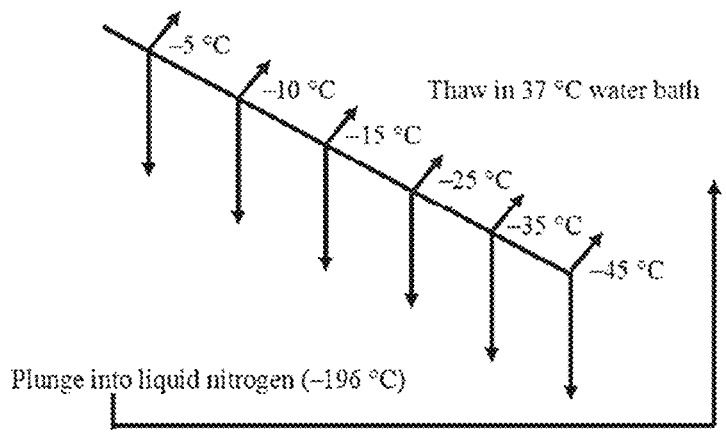

Immaterial modifications may be made to the embodiments described here without departing from what is covered by the claims.

The aim of the present study was to develop a cryopreservation protocol for cells in monolayers. HUVECs are commonly used as a model for blood vessel endothelium, and are used in vascular tissue-engineered constructs [27]. In view of the various factors that could influence post-thaw cell recovery of HUVEC monolayers we applied a graded freezing protocol to examine the effect on cell membrane integrity of: i) substrate, i.e., Rinzl™ plastic coverslips compared with glass coverslips, ii) cryoprotectants (composition and concentration), iii) addition of chondroitin sulfate, iv) cooling rate, and v) cryoprotectant removal procedures. We then applied the optimized protocol to the cryopreservation of porcine corneal endothelial cell (PCEC) and human cerebral microvascular cells (hCMEC) monolayers and examined the metabolic activity post-thaw.

A method is disclosed for cryopreservation of cells in an aqueous medium, wherein the cells are adhered to a substrate, comprising cooling the cells in the presence of a cryopreservative (CPA) or cryoprotectant to freeze the medium and convert water to ice, the ice having a coefficient of thermal expansion; wherein the substrate has a coefficient of thermal expansion that sufficiently matches the coefficient of thermal expansion of ice that damage to the cells is avoided.

For example, the addition of 2% chondroitin sulfate to 5% dimethyl sulfoxide (DMSO) and 6% hydroxyethyl starch (HES) and cooling at 0.2 or 1° C./min led to high absolute viability immediately after thaw (97.3±3.2% membrane-intact cells) when HUVECs were cultured on a substrate with a coefficient of thermal expansion similar to that of ice. Rinzl™ plastic coverslips were selected as a possible substitute for glass because Rinzl™ has a coefficient of linear thermal expansion ($\alpha_L$) of $60 \times 10^{-6}$/K similar to that of ice ($51 \times 10^{-6}$/K) whereas glass has a much lower $\alpha_L$, ($5 \times 10^{-6}$/K).

The substrate with a coefficient of thermal expansion similar to that of ice may be a glass or a glassy material such as a silicate glass, and may be a glass slide. A silicate glass may have a coefficient of linear thermal expansion between $3 \times 10^{-6}$/K and $9 \times 10^{-6}$/K, for example approximately $5 \times 10^{-6}$/K. The substrate material may have a coefficient of thermal expansion closer to ice than that of glass. The substrate material may have a coefficient of thermal expansion greater than that of glass, i.e. a coefficient of thermal expansion greater than $10 \times 10^{-6}$/K.

A substrate material with a coefficient of linear thermal expansion greater than that of glass ($\alpha_L > 5 \times 10^{-6}$/K based on our result or greater than $10 \times 10^{-6}$/K based on the range for glass) or a substrate material with a coefficient of linear thermal expansion between that of glass ($1/10^{th}$ of ice in our result) and not more than 10 times that of ice (since the effects of coefficient of linear thermal expansion on strain are multiplicative) would be soundly expected to be better than glass that is currently used. Substrate materials with a coefficient of thermal expansion of $5 < \alpha_L < 500 \times 10^{-6}$/K, based on our result or $10 < \alpha_L < 500 \times 10^{-6}$/K based on the range for glasses are soundly predicted to work.

CPA combinations and ranges soundly predicted to work based on the successful demonstrations of utility in this application disclosure and demonstrated efficacious ranges for cells in suspension (Sultani, A. B., Marquez-Curtis, L. A., Elliott, J. A. W., McGann, L. E. Improved cryopreservation of human umbilical vein endothelial cells: A systematic approach, Scientific Reports 6 Art. No.: 34393 (2016); Marquez-Curtis, L. A., McGann, L. E., Elliott, J. A. W. Expansion and cryopreservation of porcine and human corneal endothelial cells, Cryobiology 77, 1-13 (2017).): 3% or more DMSO and 6% or more HES, for example 3-10% DMSO and 6-10% HES. The following combinations of DMSO and HES are soundly predicted to work: 10% DMSO+10% HES, 10% DMSO+8% HES, 10% DMSO+5% HES, 7% DMSO+7% HES, 7% DMSO+6% HES, 3% DMSO and 6% HES.

A CPA of 2% CS, 5% DMSO and 6% HES means that the CPA solution comprises 2% CS by weight, 5% DMSO by weight, 6% HES by weight and 87% other solution where the percentage is determined by dividing the weight of the specified CPA by the total weight of the solution including the CPAs.

In one embodiment the other solution was water-based Endothelial Growth Medium from LONZA, containing growth factors and serum for HUVECs. For porcine corneal endothelial cells the cryoprotectant mixture was prepared in water-based Dulbecco's Modified Eagle Medium (DMEM) with 10% fetal bovine serum (FBS), 4 mM L-glutamine, 4.5 mg/ml glucose and 1% antibiotic-antimycotic agent. However, the protocol should work using other cell culture media appropriate for a particular cell type, as well as with buffers compatible with maintaining cell viability such as phosphate-buffered saline, Hank's balanced salt solution or HEPES.

In an embodiment, different parts of the disclosure (for example using a non-glass substrate) could be combined with other cryoprotectants. It would be expected by those skilled in the art that the DMSO might be replaced by another permeating cryoprotectant (meaning can permeate the cell membrane) and the HES might be replaced by another non-permeating cryoprotectant (meaning cannot permeate the cell membrane). Such permeating cryoprotectants include but are not limited to DMSO, glycerol, propylene glycol, ethylene glycol, formamide, ethanol and methanol. Such non-permeating cryoprotectants include but are not limited to sugars, starches, protein, serum, plasma and other macromolecules.

In an embodiment, if an application could tolerate a lower viability of cells then one could use parts of the invention in the absence of other parts, for example the chondroitin sulfate (CS) or HES could be omitted, or the plastic could be omitted and the DMSO/HES/CS combo used.

CS is beneficial for unknown reasons across a variety of tissue cryopreservation applications including at least heart valves, corneas, articular cartilage.

Cooling rates between 0.2° C./min and 1° C./min are soundly predicted to work based on our results. An earlier study also suggests that a cooling rate below 1° C./min (specifically 0.3° C./min) results in improved survival (85%) post-thaw of an immortalized human endothelial cell line (ECV304) as a confluent layer on microcarrier beads (Pegg, D. E. Cryopreservation of vascular endothelial cells as isolated cells and as monolayers. Cryobiology 44, 46-53 (2002)). A person skilled in the art would expect that there would be some tolerance to slightly higher cooling rates (e.g. 2 or 3° C./min, maybe 5° C./min). Such cooling rates may be imposed precisely with a controlled rate device, or approximately by placing cells in a container designed to provide slow cooling when placed in a freezer.

We have successfully confirmed the protocol with human cerebral microvascular endothelial cells and corneal endothelial cells from porcine and human sources. Vascular cells such as HUVECS are of mesodermal origin, whereas corneal endothelial cells originate from the neural crest. Despite differences in embryonic origin and physiological functions, and despite being from different species, these cells showed similar cryobiological responses. Therefore, it is predicted that endothelial cells lining other tissues of the body such as the inner walls of the heart and lymphatic vessels, from many species, will respond similarly. Because the mechanism of improvement is based on the coefficient of thermal expansion of the substrate and on combinations of CPAs plus an additive known to be beneficial across cells, it is reasonable to assume our protocol will be applicable across many adherent cell types. Some examples of adherent cell types include fibroblasts, epithelial cells, mesenchymal stromal cells, stem cells, hepatocytes, osteoblasts, muscle cells, cardiomyocytes, glial cells, neuronal cells, cells from tissue, cells from islets of Langerhans, testicular cells, ovarian cells, and cells in organoids.

A cell monolayer in this application means each cell is in contact with the substrate or coating of the substrate. We would also soundly expect the procedure to work for a layer that was a few cells thick, such that the main mechanisms of damage remain the same as for a monolayer and the thermal expansion mismatch is not too significant.

The range of substrates with a coefficient of thermal expansion between 10 and $500 \times 10^{-6}$/K is quite broad. A variety of plastic candidate substrate materials for this technology, based on their coefficients of thermal expansion and chemical durability are displayed in the second half of Table 1 below. (For comparison, the coefficients of linear thermal expansion for some glass materials that would not be as good are listed in the table first.) This list is not comprehensive and other materials with a coefficient of thermal expansion as soundly predicted to work may be used.

TABLE 1

Conventional materials for microscope slides, cover slips, tissue-engineering scaffolds, microfluidic devices and cells-on-a-chip technologies, including examples of potential materials for use in the proposed technology. All potential materials have at least acceptable* or excellent chemical resistance to both fresh and salt water**.

| Material | Brand, Tradenames or Designation | Composition [wt %] | Typical Applications | $\alpha_L$ [×10$^{-6}$/K] | Potential material? [Yes/No] |
|---|---|---|---|---|---|
| Soda-lime glass | Corning 0080 | 73% SiO2, 1% Al2O3, 17% Na2O, 4% MgO, 5% Cao | Microscope slides | 9.16-9.53 | No |
|  | 70 | 71% SiO2, 3% Al2O3, 13% Na2O, 1% K2O, 5% MgO, 7% Cao | Electronic and lamp tubing | 8.92-9.28 | No |
|  | 91 | 73.5% SiO2, 1% Al2O3, 15% Na2O, 0.5% K2O, 4% MgO, 6% Cao | Electronic and lamp bulbs | 8.92-9.28 | No |
|  | SCHOTT MICROCROWN | Unknown | Microscope slides | 9.4 | No |
| Borosilicate glass | SCHOTT N16B | 5% SiO2, 34% B2O3, 2% BaO, 6% ZnO, 6% ZrO2, 41% La2O3, 6% CdO | Lab ware, optics | 8.52-8.87 | No |
|  | Corning Pyrex™ 2405 | 60-80% SiO2, 10-25% B2O3, 2-10% Na2O, 1-4% Al2O3 + other oxides | Optical filters, | 4.21-4.38 | No |
|  | SCHOTT Borofloat 33 | unknown | Optics | 3.25 | No |
|  | SCHOTT N-BK7 | unknown | High quality optics and lenses, microscope slides | 7.1-8.3 | No |
|  | SCHOTT D 263 M | unknown | Microscope cover slides | 7.2 | No |
| Quartz | GE 124 type high purity fused quartz | 100% SiO2 (with trace elements <14 ppm by weight) | Quartz Discs, Quartz Microscope Slides, and Quartz Cover Slips (UV transparent) | 0.55 | No |
| Polystyrene (PS) [vinyl polymer] (unfilled, crystal) | Diamond™, Primaflex™, Polyrex™, Rinzl™ (assumed based on patents) | (CH(C6H5)—CH2)n | Microscope slides; tissue scaffolds, microfluidic devices | 90-149 | Yes |
| Polytetrafluoroethylene (PTFE) | Teflon™ | (CF2—CF2)n | Common coating on glass microscope slides | 120-170 | Yes |
| Polymethyl-methacrylate (PMMA/acrylic) | Acrylite™, Tufcoat™, Acrigel™, Perspex™; Cast sheet, or molding and extrusion compound | (CH2—C(CH3)COOCH3)n | Light fittings, safety spectacles, bone tissue implants, microfluidic devices | 90-162 | Yes |
| Polylactic acid/polylactide (PLA) | Bio-flex™, Lactel™, | (CH(CH3)CO2)n | Biodegradable packaging, medical implants, sheet and film products, tissue scaffolds | 126-145 | Yes |
| Polyethylene naphthalate (PEN) | Nopla™ | (OCOC10H6COOCH2CH2)n | Medical devices, photographic film | 130-210 | Yes |
| PCTG | Skygreen™ | Copolyester of terephthalic acid with ethylene glycol (<50%) and cyclohexanedimethanol (>50%) | Medical components | 60-91 | Yes |
| PCTA | Durastar™, Eastar™ | Copolyester of terephthalic acid with isophthalic acid with cyclohexanedimethanol | Packaging | 102-107 | Yes |
| Poly allyl diglycol carbonate (PADC) | — | (O(C2H4OC=OOCH2CHCH2))n, cross-linked | Spectacle lenses | 146-257 | Yes |
| Polycarbonate (PC) | Durolon™, Perlex™, Xylex™ | Polycarbonate homopolymer of bis-phenol A (BPA): (OC6H4C(CH3)2C6H4OC=O)n; various viscosities | Sterilisable medical components, lenses, | 120-125 | Yes |

TABLE 1-continued

Conventional materials for microscope slides, cover slips, tissue-engineering scaffolds, microfluidic devices and cells-on-a-chip technologies, including examples of potential materials for use in the proposed technology. All potential materials have at least acceptable* or excellent chemical resistance to both fresh and salt water**.

| Material | Brand, Tradenames or Designation | Composition [wt %] | Typical Applications | $\alpha_L$ [×10⁻⁶/K] | Potential material? [Yes/No] |
|---|---|---|---|---|---|
| Polycarbonate + polybutylene terephthalate (PC + PBT) | Abel ™, Xenoy ™, Lonoy ™, Lucent ™ | Blend of PC and PBT | microfluidic devices Medical applications | 70-90 | Yes |
| Polyethylene Terephthalate (PET) | Arnite ™, Lofex ™, Xcel ™ | (CO—(C6H4)—CO—O—(CH2)—O)n, unfilled, amorphous | Capacitor film, strapping, film, x-ray film, fibers | 115-119 | Yes |
| Polyethylene Terephthalate, glycol (PETG) | Eastar ™, Stat-Rite ™ | Copolyester of terephthalic acid with ethylene glycol (>50%) and cyclohexanedimethanol (<50%) | Pharmaceutical, medical devices, food contact | 123-123 | Yes |
| Polycarbonate (PC) + polyester transparent amorphous blend (optical quality) | Xenoy ™, Xylex ™ | Transparent blend of: polycarbonate + amorphous polyester | Food contact, medical devices, lenses, safety goggles | 85-90 | Yes |
| Polydimethylsiloxane (PDMS) aka vinylmethylsilicone (VMQ/Si) | Silastic ™, GE LIM ™, Momentive LSR ™ | —(OSi(CH3)2)— with some methyl groups substituted by vinyl groups as cure sites: —(OSiCH3CH=CH2)—; typically compounded with fumed silica (5-30%); h-PDMS is hard PDMS (higher crosslink density) and has the highest $\alpha_L$ value | Microfluidic devices, cell-on-a-chip technologies | 250-450 | Yes |
| Perfluoropolyethers (PFPE) | Solvay Solexis ™ | —(CF3)2—O—(CF3)2— | Microfluidic devices, cell-on-a-chip technologies | 300 | Yes |
| Poly(ethylene glycol) diacrylate (PEGDA) | Sigma ™, Katecho ™ | [chemical structure: H2C=C(C=O)—O—[CH2CH2O]n—C(=O)—CH=CH2] | Microfluidic devices, cell-on-a-chip technologies | Unknown-could not find data | Yes |
| Thermoset polyester (UP) | Bakelite, Polyrite ™ | Cross-linked copolymer of unsaturated polyester and styrene | Microfluidic devices, cell-on-a-chip technologies | 99-180 | Yes |
| Cellulose Acetate Butyrate (CAB-P) | Cellidor ™, Tenite ™ | (C6H7O5R3)n where R = —COCH3 or —COC3H7 + plasticizer | Medical/Healthcare and optical applications | 132-138 | Yes |
| Polypropylene Flame retarded (PP-FR) | Polyflam ™, Vamplen ™ | (CH2—CH(CH3))n homopolymer with fire retardant | Medical components | 56-64.3 | Yes |
| Polypropylene (Impact Copolymer, UV stabilised) (PP-I) | Polyfort ™, Moplen ™ | Block copolymer of PP homopolymer and 5-25 wt % ethylene-propylene copolymer rubber | Medical components | 118-121 | Yes |
| Thermoplastic Vulcanizate (TPV) | Gelast ™, Tectron ™, Elastron ™ | Blend of PP (~40%) and vulcanized EPDM rubber (~60%) | Medical applications and appliances | 312-328 | Yes |
| Thermoplastic Elastomer Ether-Ester (TPE) | Neostar ™, Eastman ™ | Block copolymer of a polyester (semi-crystalline hard phase-usually PBT, polybutylene terephthalate) and polyether (amorphous soft phase) | Seals, key pads | 126-227 | Yes |
| Thermoplastic Polyurethane Elastomer (TPU) | Daplen ™, Quadraflex ™ | (NH—R—NH—CO—O—R'—O—CO)n; R = a form of diisocyanate (hard segment) and R' = a short or long chain polyether diol (soft segment); BaSO4 filler | Medical applications | 78-82 | Yes |
| Cyclic Olefin Copolymer (COP) | Zeonor ™ | (CH2C5H6RR'CH2)n | Lenses | 68.3-71.8 | Yes |
| Cyclic Olefin Copolymer (COC) | Apel ™, Topas ™ | Amorphous transparent copolymer of ethylene and norbornene | Medical devices | 62-65 | Yes |
| Methyl Methacrylate Acrylonitrile Butadiene Styrene (MABS) | Estalux ™, Starex ™, Toyolac ™ | Copolymer of methyl methacrylate, acrylonitrile, butadiene, and styrene | Medical devices | 80-110 | Yes |

TABLE 1-continued

Conventional materials for microscope slides, cover slips, tissue-engineering scaffolds, microfluidic devices and cells-on-a-chip technologies, including examples of potential materials for use in the proposed technology. All potential materials have at least acceptable* or excellent chemical resistance to both fresh and salt water**.

| Material | Brand, Tradenames or Designation | Composition [wt %] | Typical Applications | $\alpha_L$ [×10$^{-6}$/K] | Potential material? [Yes/No] |
|---|---|---|---|---|---|
| Polymethylpentene (PMP) | Crystalor ™, Tpx ™ | (CH2—CH(CH2CH(CH3)2))n | Medical components | 115-119 | Yes |
| Polyethersulfone (PESU) | Colorcomp ™, Lapex ™, Westlake ™ | ((C6H4)—O—(C6H4)—SO2)n | Medical components requiring repeated sterilization | 97-101 | Yes |
| Polyphenylsulfone (PPSU) | Radel ™, Ultrason ™ | (OPhPhOPhSO2Ph)n | Medical devices | 51-61 | Yes |
| Acrylonitrile methyl acrylate copolymer (ANMA) | Barex ™ | Copolymer of acrylonitrile and methyl acrylate grafted onto nitrile butadiene rubber | Medical | 116-121 | Yes |
| Polyether Block Amide (PEBA) aka Thermoplastic Amide (TPA) | Dynastat ™, Glamide ™, Ubesta ™ | Multiblock copolymer of polyamide (e.g., PA12 ~30%) and polyether (e.g., polytetrahydrofuran ~70%) | Catheters, surgical gowns | 201-254 | Yes |
| Ethylene Vinyl Acetate (EVA) | Appeel ™, Novatec ™, Taisox ™ | Copolymer of 75% ethylene and 25% vinyl acetate | Medical equipment, stretch film | 160-190 | Yes |
| Polyvinyl Butyral (PVB) | Trosifol ™, EVERLAM ™ KB PVB ™ | (C8H14O2)n | Laminated safety glass | 80-220 | Yes |
| Polyvinylchloride elastomer (PVC-P) | Alpha ™, Sumiflex ™, Sunprene ™ | Ultrahigh molecular weight PVC, plasticizer such as DEHP | Medical applications, Sheet | 123-164 | Yes |
| Styrene Butadiene Styrene Block Copolymer (SBS) | Asaprene ™, Solplast ™, Vector ™ | Block copolymer of polystyrene (~75%) and polybutadiene (~25%) | Medical applications, Food packaging | 127-133 | Yes |
| PLGA polylactic-co-glycolic acid | Sigma ™ | 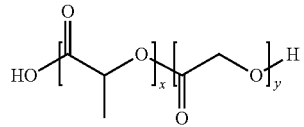 | Tissue scaffolds | Unknown- could not find data | Yes |
| PVA-MA poly(vinyl alcohol)-methacrylate | Sigma ™, Fluka ™ | Hydrogel network of PVA chains cross-linked with PMA chains | Tissue scaffolds | Unknown- could not find data | Yes |

*Acceptable: additional protection may be required.
** Excellent: material performance is not degraded after long term exposure.
NOTE:
Materials indicated as no are not suitable because they are made of glass.

Materials information was sourced from:
CES EduPack™ 2017 Version: 17.2.0, Grant Design Limited, Cambridge, UK
Molecular structure images from Sigma Aldrich
Physical Properties of polymers:
a. Website thermoscientific at the .com top-level domain (TLD)
b. CRC Materials Science and Engineering Handbook, Fourth Edition. August 2015, 461-559, CRC Press, accessed online on Jul. 7, 2017
c. Glass and plastic microscope slides:
d. The emsdiasum website at the .com TLD
e. Website Laseroptex at the .com TLD
f. Mishra, M. and Y. Yagci (2016). Handbook of Vinyl Polymers: Radical Polymerization, Process, and Technology, Second Edition, CRC Press; Chapter 17: Vinyl Polymers Applications and Special Uses, pp. 541-598.

Glass from Schott:
a. Borofloat™
  i. Schott Borofloat® materials at the University of Chicago website
  ii. Schott Borofloat® promotional materials
b. Cover Glass:
  i. Schott® cover glass promotional materials
c. Crown Glass:
  i. PGO™ optical borosilicate crown glass promotional materials
d. Technical Glass:
  i. Schott® technical glass promotional materials
Pyrex™ and Corning™ glass products:
a. Pyrex and Corning glass products promotional materials
GE Quartz:
a. Ted Pella™ GE Quartz promotional materials PEGDA:
  a. Zhong Xun Khoo, Joanne Ee Mei Teoh, Yong Liu, Chee Kai Chua, Shoufeng Yang, Jia An, Kah Fai Leong & Wai Yee Yeong (2015) 3D printing of smart materials: A review on recent progresses in 4D printing, Virtual and Physical Prototyping, 10:3, 103-122, DOI:10.1080/17452759.2015.1097054
  b. Sigma-Alrich Product specifications: 437441, 475629, 701963 accessed from sigma-alrich.com PFPE:
  a. Jae Kwan Kim et al. 2012 Nanotechnology 23 235303

PLGA:
  a. X. Miao et al. Acta Biomaterialia 4 (2008) 638-645

PLLA, PGLA:
  a. N. Rescignano et al. Polymer Degradation and Stability 108 (2014) 280-287

PEGDA:
  a. Information on PEGDA from the chemicalland21 website

PVA-MA:
  a. F. Cavalieri et al. Biomacromolecules, 2004, 5, 2439-2446

Rinzl™:
  a. Rinzl™ stated as polyvinylchloride in Patents: US20140113086 A1, EP2344212 A1
  b. Supplier: the emsdiasum website at the .com TLD Materials and Methods Cell Cultures and Monolayer Preparation HUVECs (C2519A, LONZA, Walkersville, MD, USA) were cultured in endothelial growth medium (EGM)-2 (CC-3162, LONZA) as previously described [15,50]. PCECs were isolated and cultured in supplemented Dulbecco's Modified Eagle Medium (DMEM) following previously published methods [32].

HUVECs cultured in a T-75 tissue culture flask were harvested when they had reached 70-85% confluency using passaging procedures according to manufacturer's instructions and as previously described [15]. HUVECs were sub-cultured on two different substrates, namely glass (clear borosilicate glass, 72190-09, 9×9 mm) and Rinzl™ (clear vinyl plastic, 72261-18, 18×18 mm, cut into 9×9 mm pieces) coverslips (both from Electron Microscopy Sciences, Hatfield, PA, USA). Coverslips were sterilized by immersing in 70% ethanol for at least 30 min, then washed with 25 ml phosphate buffered saline (1×PBS, 100-10-023, Life Technologies, Grand Island, NY, USA) for 15 min before transfer to a 24-well plate (Cellstar®, 662160, Greiner Bio-One, Monroe, NC, USA). Excess PBS on coverslips was removed by vacuum suction. To promote attachment of HUVECs, coverslips were treated with fibronectin from bovine plasma (F-1141, Sigma-Aldrich, Oakville, ON, Canada) at a concentration of 2.5 µg/ml for at least 30 min at room temperature. Fibronectin was prepared by adding 18 µl of stock solution (1 mg/ml) to 982 µl of PBS. 140 µl of fibronectin solution was added to each coverslip in order to cover the entire area (centre and corners), then removed after the incubation period. HUVECs and PCECs were seeded at a density of 10,000/cm$^2$ on fibronectin-coated coverslips in 500 µl of medium. The medium was replaced every other day. Day 7 cultures were used in all experiments, except for the HUVEC growth curves.

Cell Morphology and Membrane Integrity Assessment

Cell morphology was examined every day using a Labovert™ phase contrast microscope (Leitz, Los Angeles, CA, USA) equipped with a Pixera™ camera (magnification 10×). Membrane integrity was used to assess cell viability [41]. Cells were stained with SYTO 13/GelRed™. 10 µl GelRed™ (stock solution: 10,000× in water, 41003, Biotium, CA, USA) and 10 µl SYTO 13 (5 mM) (S7575, Molecular Probes, Eugene, OR, USA) were added to 262.5 µl of PBS in a microtube (final concentrations: 354×GelRed™ and 0.18 mM SYTO 13) and kept on ice in the dark. 10 µl of staining solution was added to each well containing 190 µl of media and was incubated for 5 min in the dark. Coverslips (cell side down) were then transferred onto a slide and observed under a fluorescent microscope (Leitz, Dialux™ 22) at 10× magnification. Images were captured with an Infinity3™ camera and Infinity™ Capture software (Lumenera Corporation, Ottawa, ON, Canada). 12 images were captured for each coverslip (covering the entire surface including the corners and center). Cell membrane integrity in each captured image was quantified with the Viability3 program for automated cell counting (custom software: Version 3.2, The Great Canadian Computer Company, Spruce Grove, AB, Canada). Accuracy of cell counting was visually confirmed from fluorescent images; positive and negative controls support validity of cell counting. The Viability3 program gives information about the total number of cells, numbers of green and red cells and numbers of red and green pixels in each image.

Relative viability was calculated by:

$$\text{Realtive viability} = \frac{\text{number of green cells on a coverslip}}{\text{total number of cells on a coverslip}} \times 100 \quad \text{(Eq. 1)}$$

Absolute viability was calculated by:

$$\text{Absolute viability} = \frac{\text{number of green cells on an experimental coverslip}}{\text{total number of cells on a pre-experiment coverslip}} \times 100 \quad \text{(Eq. 2)}$$

Attachment was assessed by:

$$\text{Attachment} = \frac{\text{total number of cells on an experimental coverslip}}{\text{total number of cells on a pre-experiment coverslip}} \times 100 \quad \text{(Eq. 3)}$$

Graded Freezing Procedure and Description of Controls

FIG. 1 schematically shows the graded freezing (interrupted slow cooling) procedure used to examine progressive damage to the HUVEC monolayers as a result of slow cooling to the interruption temperatures (direct-thaw) and damage as a result of further fast cooling to liquid nitrogen temperature, the storage temperature (−196° C.) (plunge-thaw) and rewarming. On day 7 of culture, coverslips (with the cell side up) were transferred to glass vials (45×15 mm, 60965D-1, Kimble Chase, Rochester, NY, USA) containing 190 µl of media with or without CPA. The cell monolayers were incubated for 15 min on ice, equilibrated in a stirred methanol bath for 2 min, ice nucleated (by touching the vials using forceps pre-cooled in liquid nitrogen), placed back in the methanol bath for 3 min to release the latent heat of fusion, and cooled at a controlled rate to various intermediate temperatures (FIG. 1). Temperatures were monitored using calibrated T-type thermocouples and an OMB-DAQ-55 data acquisition module (OMEGA Engineering Inc., Stamford, Connecticut, USA) as previously described [50].

For each experimental temperature, a pair of glass vials (each containing a coverslip) was used: one was rapidly thawed at 37° C. and the other was plunged into liquid nitrogen before thawing (FIG. 1). Plunge samples were kept in liquid nitrogen for at least 1 hour. Viability and attachment were assessed by staining with SYTO 13/GelRed™™, imaging with fluorescent microscopy and analysis using Viability 3 program as described above. Positive controls consisted of coverslips assessed for viability after incubation on ice for 15 min (pre-experiment) or for the duration of graded freezing (post-experiment) in the absence or presence of CPAs. The negative controls consisted of vials plunged directly into liquid nitrogen after 15 min incubation on ice in the absence or presence of CPA. After analyzing the post-experiment sample, the negative control sample was assessed and then samples from liquid nitrogen were thawed rapidly in the water bath at 37° C. based on the order placed in liquid nitrogen and analyzed for viability and attachment. In the absence of CPA, the ice nucleation temperature was −3° C. and samples were cooled at a rate of 1° C./min to −10, −15, −25, −35, and −45° C.

Graded Freezing in the Presence of CPA

HUVECs were also frozen in the presence of CPAs including different concentrations of DMSO (10% and 20%, w/w, Fisher Scientific, Edmonton, AB, Canada) and a combination of 5% w/w DMSO and 6% w/w HES (molecular weight range from 200 to 300 kDa, Bristol-Myers Squibb, Dublin, Ireland). All of these cryoprotectant solutions were prepared in EGM-2 in double concentration as a stock solution and then added 1:1 to each glass vial. In the first step, 95 µl of pre-warmed EGM-2 growth medium was added to each vial. Coverslips were transferred to each vial (cell side up) and 95 µl of CPA solution was added. After mixing, all vials were kept on ice for 15 min. The procedure for graded freezing in the presence of CPA was the same as that in the absence of CPA except for the nucleation temperature. For the experiment in the presence of 10% DMSO the nucleation temperature was −5° C. and the interruption temperatures were: −10, −15, −25, −35 and −45° C. For the experiment in the presence of 20% DMSO, the nucleation temperature was −10° C. and the interruption temperatures were −10, −15, −25, −35 and −45° C. In the presence of 5% DMSO and 6% HES, ice was nucleated at −5° C. and the interruption temperatures were −5, −10, −15, −25, −35 and −45° C.

CPA Removal by Serial Dilution

In order to assess the effect of CPA removal on viability, further experiments were performed on day 7 HUVEC monolayers on Rinzl™ coverslips. Cell monolayers were cooled at the rate of 1° C./min in the presence of 5% DMSO and 6% HES, plunged into liquid nitrogen from −45° C. and thawed in a 37° C. water bath to assess viability immediately after thaw. The same procedure was repeated for another frozen coverslip; however, after thawing, instead of directly assessing viability, CPA serial dilution was performed in 4 steps. In the first step 200 µl of 20% fetal calf serum (FCS) in EGM-2 was added to the glass vial and incubated for 2 min at room temperature. For the next 3 steps, 200 µl of 10% FCS in EGM-2 was added to the present solution (incubation time: 2 min per step). After 8 min (total incubation time), the total volume was about 1000 µl. After discarding this solution, cells were incubated with 190 µl of PBS and 10 µl of SYTO 13/GelRed™ for 5 min in the dark and viability was assessed as described above.

Addition of Chondroitin Sulfate (CS) to the CPA Solution

Chondroitin sulfate (CS) was added to the CPA solution in order to assess its effect on cell viability post-thaw. Day 7 HUVECs and PCECs on Rinzl™ coverslips were subjected to slow cooling in the presence of 2% w/w CS, 5% w/w DMSO, and 6% w/w HES in medium. CPA solution was prepared in double concentration as a stock solution and added 1:1 to each glass vial. For unfrozen controls, two coverslips were used for pre-experiments in the absence and presence of CPA and were assessed after 15 min incubation on ice. For HUVECs, two coverslips were cooled at 1° C./min to −45° C., plunged into liquid nitrogen for at least an hour and then thawed in a water bath at 37° C. One coverslip was assessed immediately after thaw. Since CS masks the fluorescence signal, 500 µl of PBS was added to the vial after thaw, and the solution was removed after 5 min. 190 µl of PBS was then added to the vial and cells were stained with SYTO 13/GelRed™ and assessed for viability. For the second coverslip, CPA was removed by serial dilution as described above and cells were stained with SYTO 13/GelRed™. Post-experiment controls were coverslips in the presence of CPA incubated on ice for the duration of the experiment for which no freezing had occurred. Post-experiment samples were assessed for viability before CPA removal and after CPA removal by serial dilution.

Graded Freezing of HUVEC and PCEC Monolayers on Rinzl™ in the Presence of DMSO/HES/CS at a Cooling Rate of 0.2° C./Min In order to assess the effect of a lower cooling rate on viability, graded freezing was also performed at a cooling rate of 0.2° C./min. HUVEC and PCEC monolayers were subjected to graded freezing (cooling rate: 0.2° C./min) in the presence of 2% CS, 5% DMSO and 6% HES. Ice was nucleated at −5° C. and the interruption temperatures were −5, −10, −15, −25, −35 and −45° C. for HUVECs and −10, −20, −30, −40, and −50° C. for PCECs. After thawing, viability was assessed immediately by adding 500 µl of PBS to the vial, the entire solution was removed after 5 min, 190 µl of PBS was added to the vial and cells were stained with SYTO 13/GelRed™. The experiments were repeated 3 times independently (N=3) for both direct and plunge-thaw samples, except for experiments for the HUVECs plunge-thaw samples from −45° C. for which the experiments were repeated 6 times.

Assessment of Membrane Integrity and Metabolic Activity of PCECs after Extended Incubation Following CPA Removal Post-Thaw PCECs were cultured on fibronectin-coated Rinzl™ coverslips over a period of 7 days and then cells were slowly cooled to −40° C. (cooling rate: 0.2° C./min or 1° C./min) in the presence of 5% DMSO, 6% HES and 2% CS, then plunged into liquid nitrogen. After rapid thawing in a 37° C. water bath, the CPA was removed either by a single PBS wash or by serial dilution as described above. The PCEC monolayers were either immediately stained with SYTO 13/GelRed™ or were incubated overnight (at least 12 hours) in media at 37° C. and 5% CO2. The next day, assessments of membrane integrity (SYTO 13/GelRed™ staining) and AlamarBlue™ reduction were carried out. For the AlamarBlue™ assay 20 µl of AlamarBlue™ reagent (Invitrogen, Life Technologies Inc., Eugene, OR, USA) was added to 200 µl of media covering the PCEC monolayers and the samples were incubated for at least 4 h at 37° C. Absorbance was measured at 570 nm using 600 nm as a reference wavelength (SpectraMax Plus, Molecular Devices, San Jose, CA, USA). The percent reduction of AlamarBlue was calculated as per manufacturer's instructions with corrections applied for no-cell controls.

Statistical Analysis

Viability and attachment of HUVECs on glass or Rinzl™ coverslips were assessed after graded freezing at 1° C./min in the absence or presence of 10% DMSO, 20% DMSO or a combination of 5% DMSO and 6% HES. For the graded freezing experiments, two coverslips were used with one replicate for either direct-thaw or plunge-thaw for each interruption temperature. Three to six independent experiments were performed for each experimental condition. Data represent mean±standard error of the mean (SEM). We also compared the mean absolute viability for the different experimental conditions (CPA compositions and cooling rates) using the independent samples t-test (two-tailed) (IBM SPSS Statistics 24 or Microsoft Excel™). Differences among groups were considered significant when the p-value was less than 0.05.

Results

HUVEC Confluent Monolayers

The establishment of a confluent monolayer is necessary to ensure consistency for the evaluation of experimental outcomes following cryopreservation of adherent cell populations. To promote adhesion of HUVECs to the substrate, coverslips were first coated with fibronectin, a natural extracellular matrix component of the vascular endothelium. Growth rates were evaluated to assess the proliferative activity and morphology of HUVECs on fibronectin-coated glass and Rinzl™ coverslips (Tables 4 and 5). Day 7 was selected as the day for performing the experiments for both glass and Rinzl™ as growth kinetics showed that cells had attained full confluence.

Graded Freezing of HUVEC Monolayers: Effects of Substrate and CPAs

The direct-thaw samples from the graded freezing protocol (FIG. 1) reveal slow-cool cell injury (dehydration damage from solute effects), while the plunge-thaw samples give indication of rapid-cool injury (due to intracellular ice formation). First, we examined the effect of the substrate by subjecting HUVEC monolayers, cultured on glass vs. Rinzl™ coverslips, to graded freezing at a cooling rate of 1° C./min. At the same time, we investigated the effect of different CPA concentrations and composition by conducting the experiments in the absence or presence of 10% w/w DMSO, 20% w/w DMSO or a combination of 5% w/w DMSO and 6% w/w HES. Pre-experiment and post-experiment positive controls (unfrozen monolayers) for all experimental conditions showed >92% viability (Tables 6 and 7). Plunging monolayers into liquid nitrogen from 0° C. in the absence of CPA (negative control) resulted in viability less than 1.1±0.6%. Because freeze-thaw processes may cause cell detachment from the surface, we assessed absolute viability (Eq. 2) to capture both relative viability (Eq. 1) and cell attachment (Eq. 3).

Comparison of HUVEC Absolute Viability after Graded Freezing in the Absence and Presence of CPAs on Glass Coverslips Comparison of direct-thaw absolute viability for HUVECs seeded on glass coverslips (FIG. 2A) showed that the presence of CPAs significantly increases cell viability compared with results in the absence of CPAs (p=0.001). Directly thawed cells showed very high viability in the presence of 5% DMSO and 6% HES for all experimental temperatures. While the presence of DMSO increased cell viability compared to the results in the absence of CPAs, there was no statistically significant difference between cell viability for cells in the presence of 10% and 20% DMSO. It is therefore proposed that 20% DMSO is not more effective than 10% DMSO in preserving cell viability in directly thawed samples.

Figure 2A:
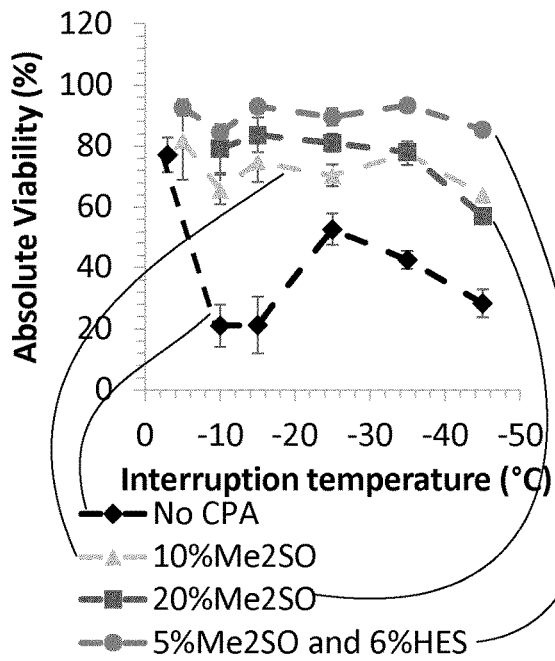
FIGS. 2A-2D show graphs of HUVEC absolute viability after direct-thaw and plunge-thaw on fibronectin-coated glass and Rinzl™ coverslips. HUVECs were seeded at a density of 10,000/cm$^2$ and cultured for a period of 7 days. HUVECs were subjected to graded freezing in the absence or presence of cryoprotectants (DMSO represented as Me2SO in legend) at a cooling rate of 1° C./min. Broken lines show the viability of HUVECs for direct-thaw samples on fibronectin-coated glass (FIG. 2A) and Rinzl™ (FIG. 2C) coverslips. Solid lines show the viability of HUVECs for plunge-thaw samples on fibronectin-coated glass (FIG. 2B) and Rinzl™ (FIG. 2D) coverslips. Absolute viability is the ratio of the number of live cells on the coverslip to the total number of cells on a pre-experiment control (unfrozen) coverslip. For each experiment and for each interruption temperature, one coverslip was used for direct-thaw and one for plunge-thaw. Results are the average of three independent experiments (N=3) except the sample in the presence of DMSO and HES on Rinzl™ plunged from −45° C. which is the result of 6 independent experiments. Data are presented as mean±standard error of the mean.
Figure 2B:
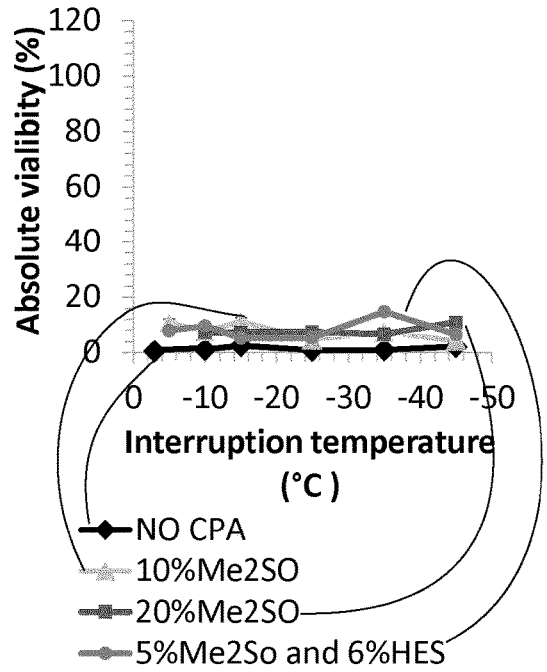

In contrast with direct-thaw samples, in the absence of cryoprotectants cell viability was very low after plunge-thaw for all experimental temperatures (FIG. 2B). The presence of 10% DMSO led to an increase in cell viability after plunge-thaw for all experimental temperatures compared with results in the absence of DMSO (p=0.001) except at −45° C. Incubation with 20% DMSO did not increase cell viability after plunge-thaw compared with 10% DMSO for all temperatures except at −45° C. (p=0.001). The combination of DMSO and HES did not affect cell viability compared with 20% DMSO except for samples plunged into liquid nitrogen from −35° C. which showed higher viability compared to cells exposed to 20% DMSO (p=0.000).

Analysis of Response of HUVECs During Direct-Thaw and Plunge-Thaw on Glass Coverslips Graded freezing on glass in the absence of CPA for direct-thaw samples showed that decreasing temperature from −3° C. to −15° C. led to a decrease in absolute cell viability. An increase in absolute cell viability was observed as temperature decreased to −25° C. Further decreasing the temperature to −45° C. was accompanied by loss of absolute cell viability.

Direct-thaw from −3° C. showed minimal loss of absolute cell viability. In this study, ice was nucleated at −3° C. During the freezing process, as temperature decreases, ice forms initially in the extracellular environment [59]. As temperature decreases from −3° C. to −15° C., more ice forms in the extracellular environment. This ice formation results in increase of the solute concentration in the extracellular environment. The increase in solute concentration causes osmotic efflux of water from the cells. This efflux of water leads to cell dehydration and decrease in cell volume [36]. Therefore, cell volume decreases and a lower amount of water is available in cells at −15° C. compared with −3° C. In comparison with the study by Acker et al. which showed 100% formation of intracellular ice in a MDCK monolayer at temperatures lower than −3° C. (cooling rate 25° C./min, which produces a high degree of super cooling), in these experiments during cooling from −3° C. to −15° C., intracellular ice is less likely to be formed due to the low cooling rate [1]. Cooling rate is a primary factor that affects intracellular ice formation [60]. In this study, the cooling rate was 1° C./min, which is considered to be slow cooling.

One of the main challenges in monolayer cryopreservation is preserving cell attachment to the surface. As described earlier, the absolute viability is the ratio of the average total number of cells on a coverslip to the average total number of cells on a pre-experiment coverslip. One possible explanation for the decrease in the absolute viability of direct-thaw samples from −3° C. to −15° C. is partly due to cell detachment (87.6±5.8% at −3° C. vs 71.6±2.3% at −15° C.). A study by Ebertz et al. also showed cell detachment in monolayer cryopreservation of human corneal endothelial cells [14].

From −15° C. to −25° C., an increase in absolute cell viability was observed. This higher absolute viability compared with the first section, can be due to lower detachment from the coverslips. As temperature decreased from −25° C. to −45° C., cells showed a reduction in absolute cell viability. The high concentration of solutes in both the intra- and extra-cellular environments can be a factor [62], and mechanical stress due to the presence of extracellular ice may be another factor, which affects cell viability [61].

The difference between responses of the cells in monolayer and suspension may be due to cell-cell and cell-surface interactions [2]. A study by Acker et al. showed that on cooling at a specific rate, the incidence of intracellular ice formation in hamster fibroblasts was higher in a colony attached to the substrate compared with cells in suspension, due to the presence of cell-cell and cell-surface interactions [2]. Cell-cell interaction is one of the factors that can lead to ice propagation during a freezing process. As discussed earlier, two theories are present for ice propagation in adjacent cells: Surface-catalyzed nucleation [63] or the presence of gap junctions, which facilitate ice propagation to adjacent cells in a monolayer [1].

For all experimental temperatures, the maximum damage occurred when cells were plunged into liquid nitrogen, which showed itself as a dramatic loss of absolute cell viability. Plunging into liquid nitrogen is detrimental for all experimental temperatures.

Comparison of Absolute Viability for HUVECs on Rinzl™ Cover Slips in the Absence and Presence of CPAs after Direct-Thaw Comparison of absolute viabilities for direct-thaw samples showed that the presence of cryoprotectants does affect cell viability compared with the cells in the absence of CPA. This difference was particularly noticeable in the presence of 5% DMSO and 6% HES with the highest viability (90.8±10.2%).

Figure 2C:
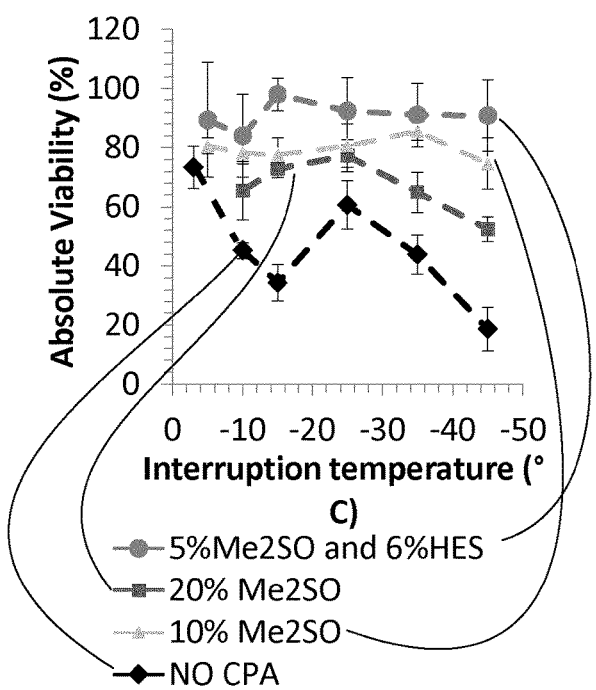

The presence of 10% DMSO increased cell viability at all experimental temperatures compared with results in the absence of DMSO (p=0.001). Increasing the concentration of DMSO led to an increase in the viability of the cells compared with the results in the absence of DMSO. However, increasing the DMSO concentration to 20% did not affect cell viability compared with the results for cells exposed to 10% DMSO except at −35° C. (p=0.001) and −45° C. (p=0.001) (FIG. 2C).

Figure 2D:
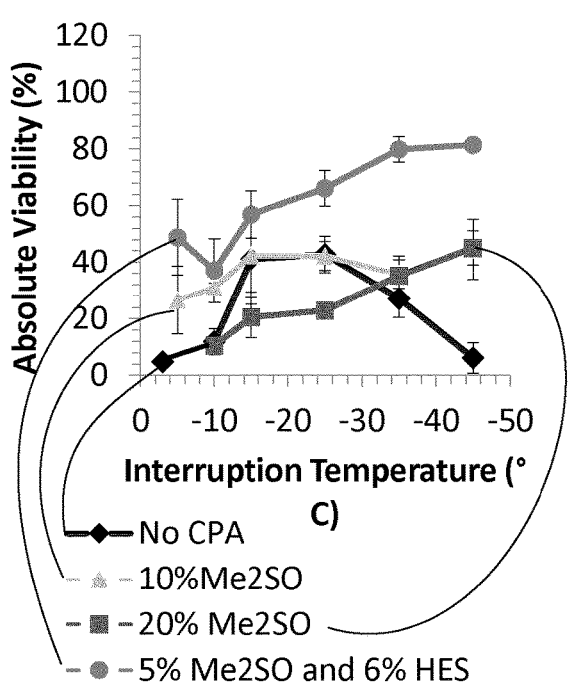

For all experimental temperatures, the presence of 5% DMSO and 6% HES in a cryoprotectant solution led to an increase in cell viability compared with the cells in the absence of CPA. In addition to direct-thaw, the presence of DMSO and HES led to an increase in cell viability for plunge-thaw samples with the highest absolute viability at −45° C. (81.4±0.3%). The results of the graded freezing experiments showed that a substrate is one of the factors which affect cell viability for monolayer freezing (FIG. 2D).

Graded Freezing of HUVEC Monolayers: Effects of Substrate and CPAs

For HUVEC monolayers on glass, the presence of 10% and 20% DMSO increased absolute viability for direct-thaw samples compared to samples in the absence of CPA (FIG. 2A). There was no statistically significant difference between absolute viability for cells in the presence of 10% DMSO or 20% DMSO, p>0.05 for all experimental temperatures (FIG. 2A). The highest absolute viability was observed for direct-thaw samples in the presence of 5% DMSO and 6% HES for all experimental temperatures. For plunge-thaw samples, in the absence of CPAs cell viability was very low for all experimental temperatures (FIG. 2B). The maximum absolute viability (14.6±3.8%) was achieved in the presence of 5% DMSO and 6% HES for samples plunged into liquid nitrogen from −35° C.

For HUVECs on Rinzl™, cell response after direct-thaw was similar to that on glass. The increase in absolute viability compared to control was particularly noticeable in the presence of 5% DMSO and 6% HES with the highest absolute viability (98.0±2.0%) for the samples directly thawed from −15° C. (FIG. 2C). The maximum absolute viability after plunge-thaw in the absence of CPAs was 42.1±15.7%. The highest absolute viability was achieved in the presence of 5% DMSO and 6% HES, after plunging into liquid nitrogen from −45° C. (80.5±1.4%, FIG. 2D). Based on the absolute viabilities of plunge-thaw samples, it is apparent that HUVEC monolayers on Rinzl™ coverslips are more tolerant to intracellular ice formation damage particularly in the presence of 5% DMSO and 6% HES. Therefore, the succeeding experiments were all carried out on HUVEC monolayers cultured on Rinzl™ coverslips in the presence of 5% DMSO and 6% HES. Cell detachment from the surface was also assessed on both fibronectin-coated glass and Rinzl™ coverslips in the absence and presence of CPAs. Direct-thaw and plunge-thaw samples showed a high degree of cell attachment whether HUVECs were cultured on glass or Rinzl™ in the presence of CPAs (FIGS. 7A-7D).

The Effect of CPA Removal by Serial Dilution

In the preceding experiments, the absolute viability was assessed immediately after thaw without removal of the CPAs. Because downstream applications of thawed monolayers would often require cultures in the absence of CPAs, in this section, we report assessment of the viability after CPA removal. HUVECs cultured on Rinzl™ coverslips were subjected to cooling in the presence of 5% DMSO and 6% HES at a cooling rate of 1° C./min and plunged into liquid nitrogen from −45° C. Absolute viability immediately after thawing was 80.5±1.4% (FIG. 2D). However, a considerably lower absolute viability of the cells (10.4±8.3%) was observed after CPAs were removed by serial dilution (Table 2, below). Post-experiment control (unfrozen) coverslips showed high viability in the absence or presence of CPA (before removal) (Table 8). This procedure of CPA removal for a post-experiment control (unfrozen) coverslip did not have any effect on cell viability (98.7±0.4%). Therefore, the cause of the decline in viability was not due to the removal procedure itself but rather to the sensitivity of previously frozen cells to the CPA removal procedure. We next examined whether an additive to the CPA solution (5% DMSO and 6% HES) would improve post-thaw outcome.

The Effect of Chondroitin Sulfate on Post-Thaw Cell Viability

Because of previously reported beneficial effects of chondroitin sulfate (CS) on the cryopreservation of tissues [11, 19,22], we tested the effect of adding 2% w/w CS to the CPA solution. HUVEC monolayers were cooled at a rate of 1° C./min in the presence of 2% CS, 5% DMSO and 6% HES and were plunged into liquid nitrogen from −45° C. Immediately after thaw, CS, along with the CPAs, was removed by a single wash using PBS. HUVECs showed high viability (92.8±6.9%) (Table 2). We also removed CPA by serial dilution to assess the effect of CPA removal on post-thaw viability. We found that the presence of 2% CS could also preserve post-thaw absolute viability after CPA removal compared with the sample frozen in the presence of 5% DMSO and 6% HES alone, (96.6±2% vs. 10.4±8.3%) (Table 2). From here on, graded freezing experiments were carried out with HUVEC monolayers on Rinzl™ in the presence of 5% DMSO, 6% HES and 2% CS, and CPA was removed immediately after thaw by a single PBS wash before the assessment of viability.

The Effect of Cooling Rate

Figure 3:
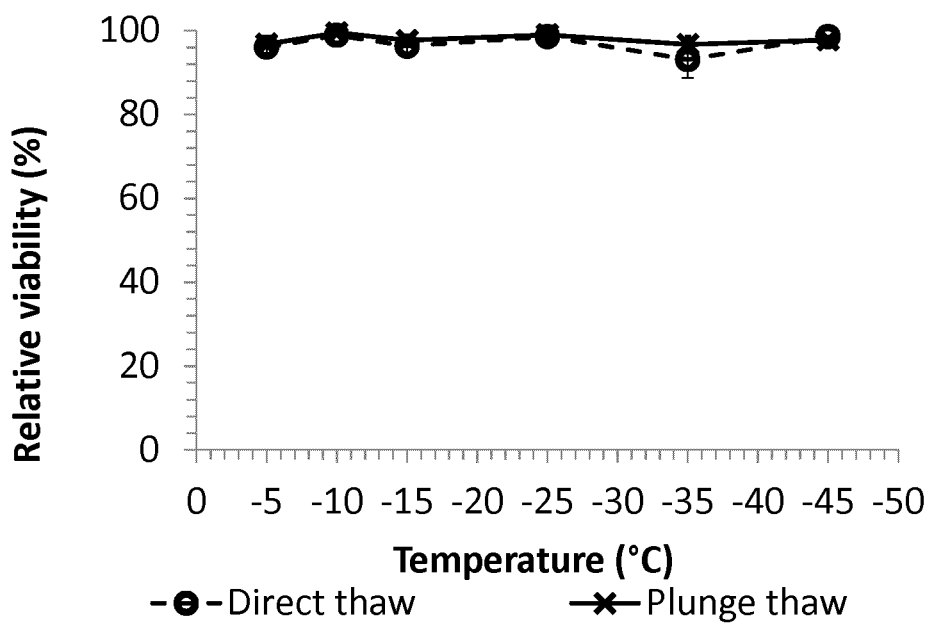
FIG. 3 shows a graph of relative viability of HUVEC monolayers on fibronectin-coated Rinzl™ coverslips after direct-thaw and plunge-thaw in the presence of 2% w/w CS, 5% w/w DMSO, and 6% w/w HES at a cooling rate of 0.2° C./min. CPA was removed immediately after thaw by a single PBS wash. Relative viability is the ratio of the number of live cells to the total number of cells on a coverslip. For each interruption temperature, two coverslips were used (one for direct-thaw and one for plunge-thaw). Results are the average of three independent experiments (N=3), except for the plunge-thaw sample for −45° C. which was repeated 6 times independently (N=6). Data represent mean±standard error of the mean.

Previously, others showed higher recovery of cells when monolayers were cooled at lower rates [5,42,45]. To test the effect of cooling rate on post-thaw viability, HUVECs on Rinzl™ coverslips were subjected to graded freezing at a cooling rate of 0.2° C./min after incubating them with 2% CS, 5% DMSO and 6% HES for 15 min on ice. The combination of all factors (Rinzl™ substrate, DMSO/HES/CS in cryoprotectant solution, and a cooling rate of 0.2° C./min) resulted in very high relative viability for all experimental temperatures for both direct-thaw and plunge-thaw samples (FIG. 3). The method of CPA removal, whether by serial dilution or single washing with PBS did not affect absolute viability (97.3±3.2% and 94.9±5.4%, respectively) (Table 2).

Summary of Experimental Conditions for the Optimized Protocol

Figure 4:
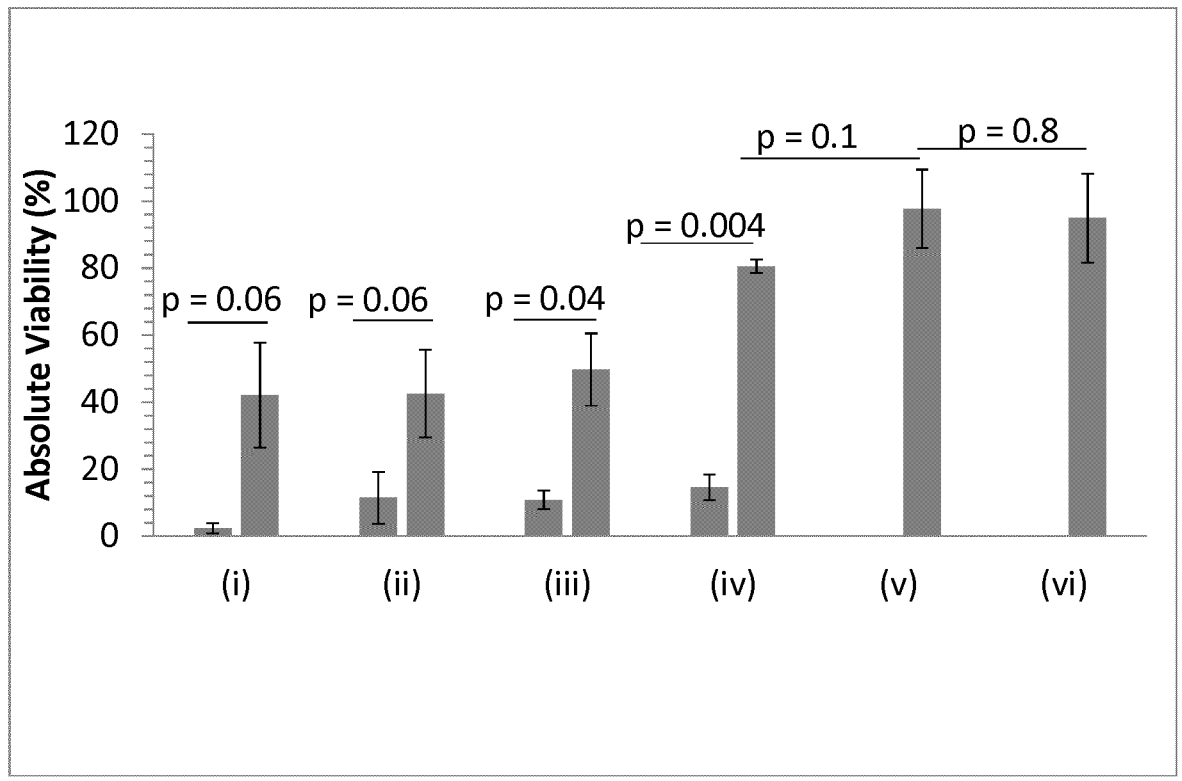
FIG. 4 shows a comparison of absolute viability of HUVECs cultured on glass or Rinzl™ coverslips after plunge-thaw from −45° C. in the absence or presence of 10% w/w DMSO, 20% w/w DMSO, a combination of 5% w/w DMSO and 6% w/w HES at a cooling rate of 1° C./min and a combination of 2% CS w/w, 5% DMSO w/w and 6% HES w/w at a cooling rate of either 1° C./min or 0.2° C./min. (i) is no CPA, 1° C./min, (ii) is 10% DMSO, 1° C./min, (iii) is 20% DMSO, 1° C./min, (iv) is 5% DMSO and 6% HES, 1° C./min, (v) is 5% DMSO, 6% HES and 2% CS, 1° C./min, (vi) is 5% DMSO, 6% HES and 2% CS, 0.2° C./min. The results are immediately after thaw, and when in the presence of CS, CPA was removed by a single PBS wash. The results are the average of three independent experiments (N=3), except the results of experiments for 5% DMSO and 6% HES (cooling rate: 1° C./min) and 5% DMSO, 6% HES and 2% CS (cooling rate: 1° C./min or 0.2° C./min) for which the results are the average of 6 independent experiments. Comparisons were performed by independent samples t-tests (two-tailed). The significance level was considered to be 5%. The left side bar of the pair of bars in (i), (ii), (iii) and (iv) is glass, the right side bar of the pair of bars in (i), (ii), (iii) and (iv), and the bars in (v) and (vi) is Rinzl™.

FIG. 4 presents the results of the systematic testing of various factors to attain the maximum post-thaw absolute viability of HUVEC monolayers after graded freezing and storage in liquid nitrogen. First, Rinzl™ proved superior over glass as a substrate for HUVEC monolayers cooled at 1° C./min, whether in the absence or presence of CPAs. Secondly, the CPA composition that yielded the highest absolute viability (80.5±1.4%) after plunge from −45° C. was the combination of 5% DMSO and 6% HES. Thirdly, the addition of 2% CS further improved the absolute viability (92.8±6.9%); and this value was not affected by the procedure of CPA removal (Table 2). Lastly, there was no significant difference between cooling at 1° C./min vs. 0.2° C./min. Table 9 shows degrees of freedom, p-values and t-values for independent samples t-test (two-tailed) for comparison of maximum absolute viability of HUVECs for different the experimental conditions.

TABLE 2

Absolute viability (%) of HUVEC monolayers cryopreserved on fibronectin-coated Rinzl ™ coverslips for different experimental conditions (cryoprotectant composition and cooling rate).*

| Experimental conditions | No CPA removal | CPA removal by serial dilution |
|---|---|---|
| 5% DMSO, 6% HES (cooling rate: 1° C./min) | 80.5 ± 1.4 | 10.4 ± 8.3 |

| | CPA removal by PBS single wash | CPA removal by serial dilution |
|---|---|---|
| 5% DMSO, 6% HES, 2% CS (cooling rate: 1° C./min) | 92.8 ± 6.9 | 96.6 ± 2 |
| 5% DMSO, 6% HES, 2%CS (cooling rate: 0.2° C./min) | 94.9 ± 5.4 | 97.3 ± 3.2 |

*HUVECs were cooled to −45° C. (at a cooling rate of 1° C./min or 0.2° C./min), plunged into liquid nitrogen and stored, rapidly thawed and assessed for viability. For the first experimental condition, CPA was either not removed or removed by serial dilution. For the second and third experimental conditions, CPA was removed immediately after thaw by a single wash with PBS or by serial dilution. Data are the result of six independent experiments (N = 6) and are presented as mean ± standard error of the mean.

Graded Freezing of Porcine Corneal Endothelial Cells

Figure 5A:
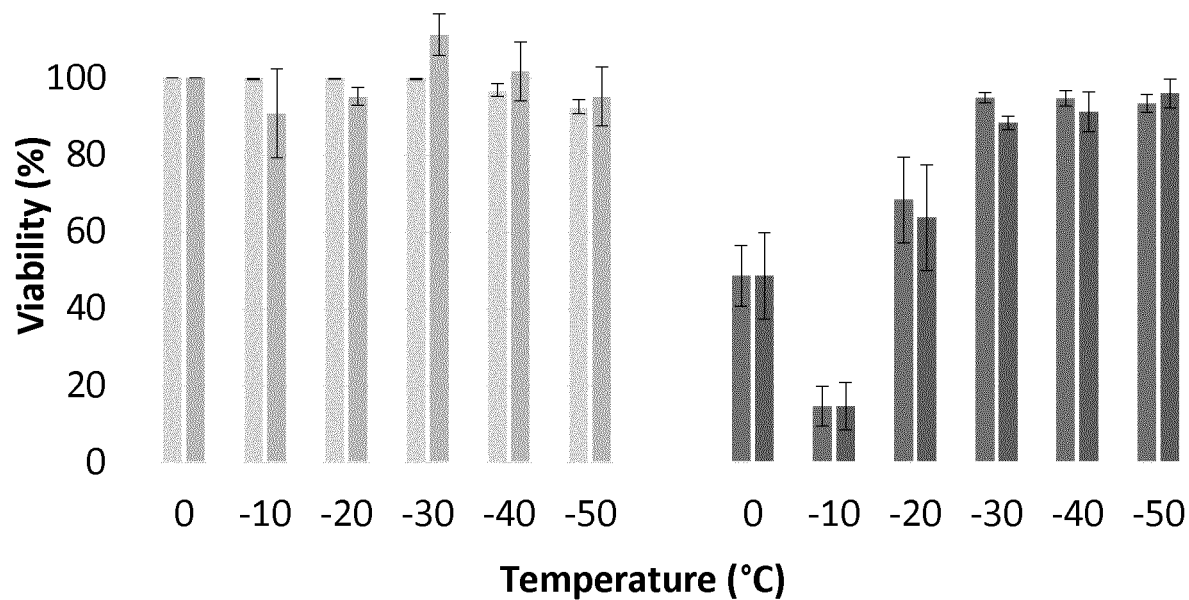
FIGS. 5A and 5B show graphs of relative (left side bars of each pair of bars) and absolute (right side bars of each pair of bars) viabilities of porcine corneal endothelial cell monolayers on fibronectin-coated Rinzl™ coverslips after graded freezing in the presence of 5% DMSO, 6% HES and 2% CS at a cooling rate of (A) 1° C./min or (B) 0.2° C./min immediately after thaw and CPA removal by a single PBS wash. Relative viability was calculated from the ratio of the number of live cells to the total number of cells on a coverslip; absolute viability was calculated from the ratio of the number of live cells to the total number of cells on an unfrozen control. For each interruption temperature, one coverslip was assessed for direct-thaw (lighter shaded bars on the left side of the figures) and another for plunge-thaw (darker shaded bars on the right side of the figures). Data represent the mean of three independent experiments (N=3) ±standard error of the mean.
Figure 5B:
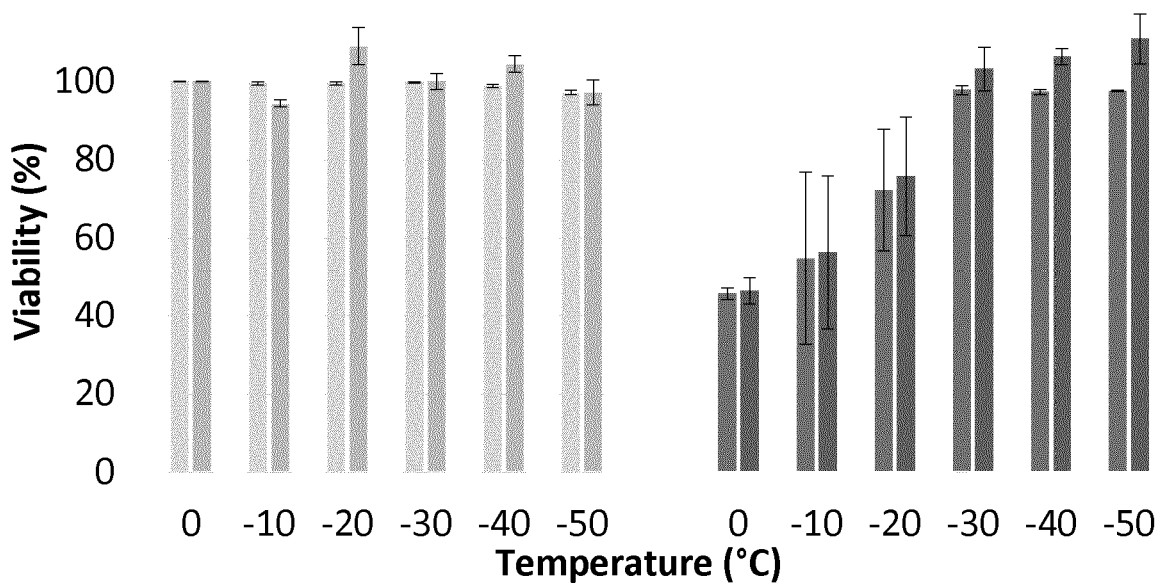

We were interested to see whether the optimized protocol for HUVECs would apply to another cell type, porcine corneal endothelial cells (PCECs). Passage 2-4 cells were seeded on fibronectin-coated Rinzl™ coverslips and day 7 confluent monolayers were subjected to graded freezing similar to HUVECs (FIG. 1) except that the interruption temperatures examined were −10, −20, −30, −40 and −50° C. The PCEC monolayers were incubated in media containing 5% w/w DMSO, 6% w/w HES and 2% w/w CS for 15 min on ice, equilibrated at −5° C. in a methanol bath, ice nucleated, and cooled at 0.2° C./min or 1° C./min to the desired interruption temperature. Direct-thaw and plunge-thaw samples were stained with SYTO 13/GelRed™ and analyzed by fluorescent microscopy immediately after thaw and removal of the CPA by a single PBS wash. Relative and absolute viabilities were calculated as before. Direct-thaw samples demonstrated consistently high (over 90%) relative and absolute viabilities (FIGS. 5A and 5B), indicating that the PCEC monolayers were tolerant to damage induced by solute effects and cell dehydration. Plunge-thaw samples show sensitivity to injury due to intracellular ice formation, particularly at the higher interruption temperatures when water inside the cell did not have enough time to leave. The resulting decrease in viability was particularly noticeable at −10° C. when the PCEC monolayers were cooled at a faster rate (1° C./min compared to 0.2° C./min). However, at lower interruption temperatures (−30, −40 and −50° C.), the relative and absolute viabilities were mostly over 90%, with no significant statistical difference between cooling at 0.2° C./min vs. 1° C./min (p>0.05) (FIGS. 5A and 5B). Our results confirm that the cryopreservation protocol optimized for vascular endothelial monolayers (HUVECs) may be applied to porcine corneal endothelial cell monolayers (PCECs).

Viability and Function of PCEC Monolayers after Extended Post-Thaw Incubation

Because the plunge-thaw samples were assessed for membrane integrity immediately after CPA removal, it was important to ascertain whether the high viability could be maintained and whether the cell monolayer could sustain metabolic activity after extended incubation. PCEC monolayers on fibronectin-coated Rinzl™ coverslips were subjected to cooling at 0.2° C./min or 1° C./min to −40° C. in the presence of 5% w/w DMSO, 6% w/w HES and 2% w/w CS, then plunged into liquid nitrogen. The samples were rapidly thawed and the CPA mixture was removed from the monolayers either by a single PBS wash or by serial dilution. One sample was stained with SYTO 13/GelRed™ immediately after CPA removal by PBS wash and the relative and absolute viabilities were determined. Two duplicate samples from which CPA was removed either by PBS wash or serial dilution were incubated at 37° C. overnight (at least 12 hours) and analyzed for membrane integrity (SYTO 13/GelRed™ staining) and metabolic activity (AlamarBlue™ reduction) the next day. The AlamarBlue™ reagent solution contains the non-fluorescent blue-colored molecule resazurin, which, when chemically reduced (a metabolic activity of cells), turns into the highly fluorescent red-colored resorufin. The color change provides a quantitative measure of the mitochondrial activity of the cells.

Figure 6A:
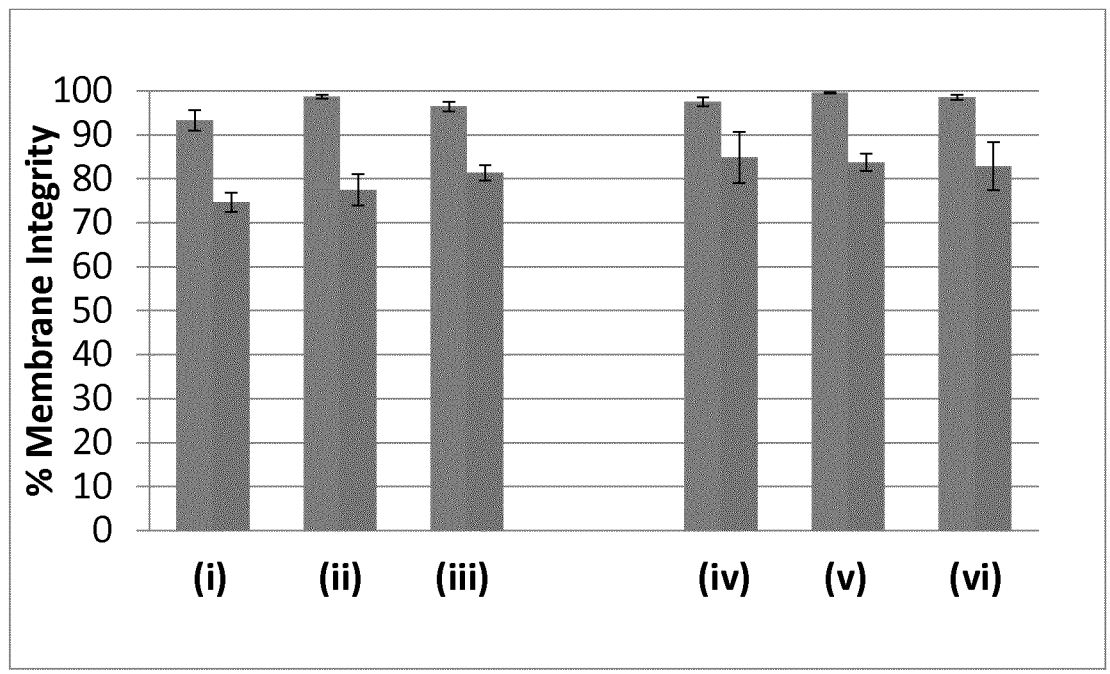
FIG. 6A shows a graph of relative (left side bars of each pair of bars) and absolute (right side bars of each pair of bars) viabilities and FIG. 6B shows a graph of metabolic function of porcine corneal endothelial cell monolayers on fibronectin-coated Rinzl™ coverslips after cooling to −40° C. in the presence of 5% DMSO, 6% HES and 2% CS at a cooling rate of 1° C./min or 0.2° C./min. % membrane integrities were assessed either immediately after thaw and CPA removal by a single PBS wash (PBS) or serial dilution (SD) or after overnight incubation (at least 12 hours, next day) post-thaw. The AlamarBlue™ % reduction was normalized against unfrozen control. Data represent the mean of independent experiments (N=3 for A and N=2 for B)±standard error of the mean.
Figure 6B:
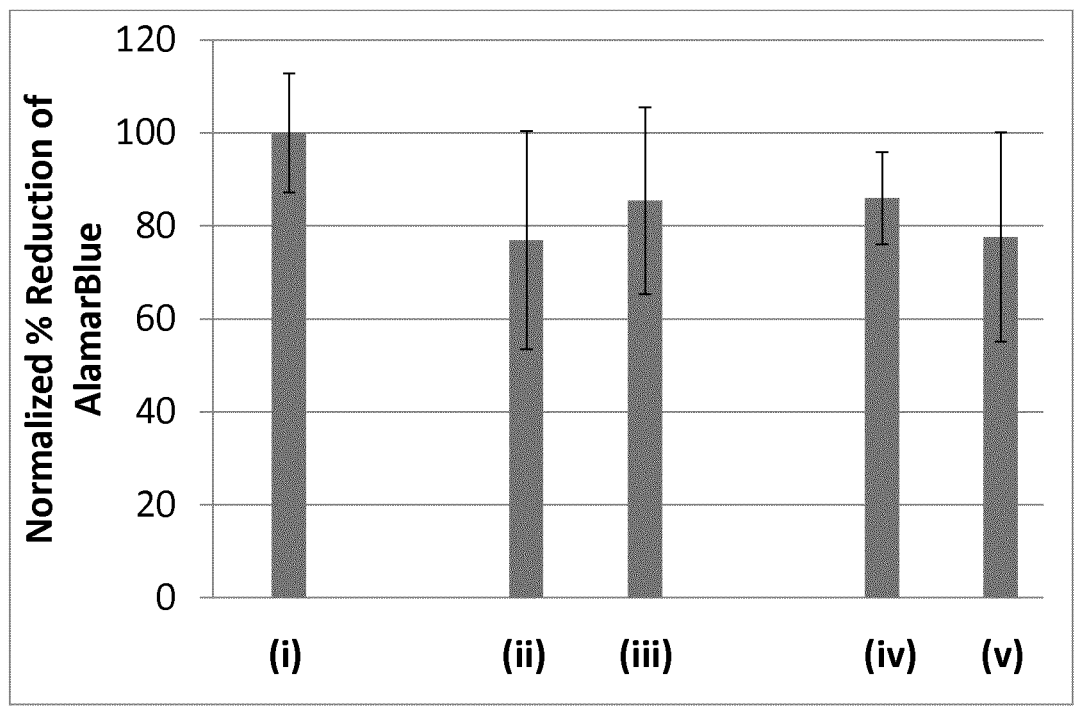
Figure 7A:
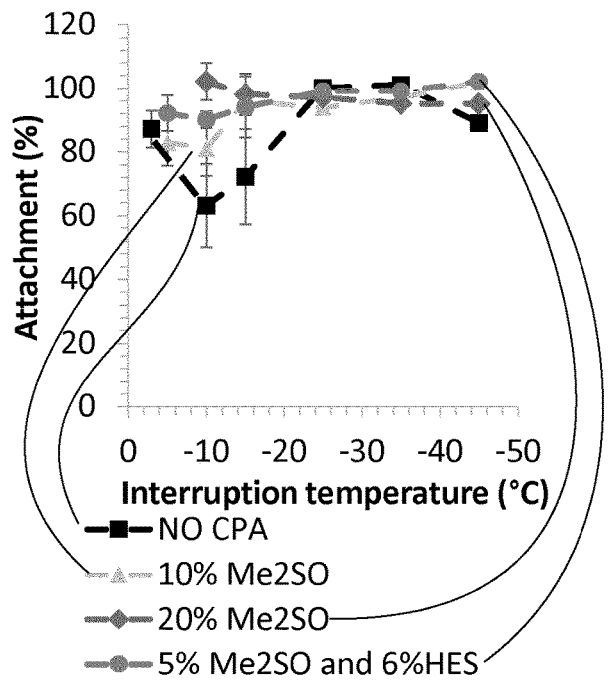
FIGS. 7A-7D show graphs of HUVEC attachment after direct-thaw (FIGS. 7A and 7C) and plunge-thaw (FIGS. 7B and 7D) on fibronectin-coated glass coverslips in FIGS. 7A and 7B, and on fibronectin-coated Rinzl™ coverslips in FIGS. 7C and 7D. Attachment is the ratio of total number of cells on an experimental coverslip to the total number of the cells on a pre-experiment control unfrozen coverslip. For each interruption temperature, results are the average of three independent experiments (N=3) and data represent mean±standard error of the mean.
Figure 7B:
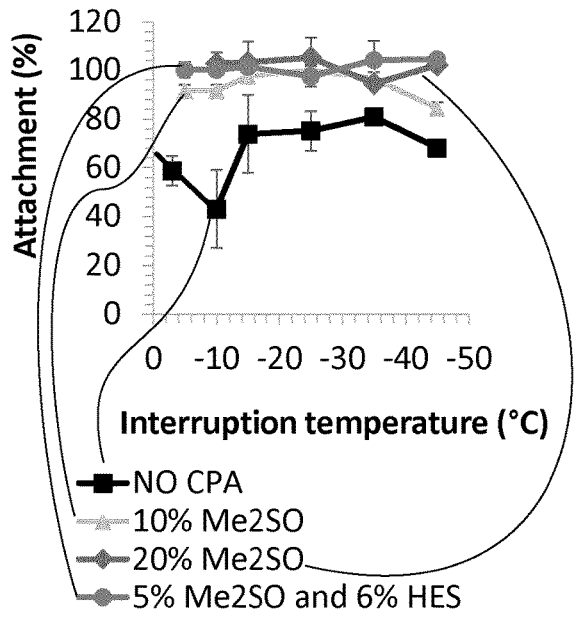
Figure 7C:
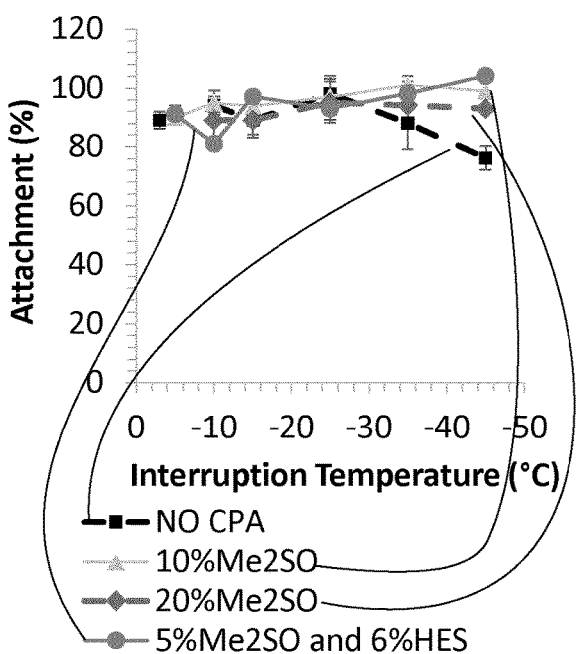
Figure 7D:
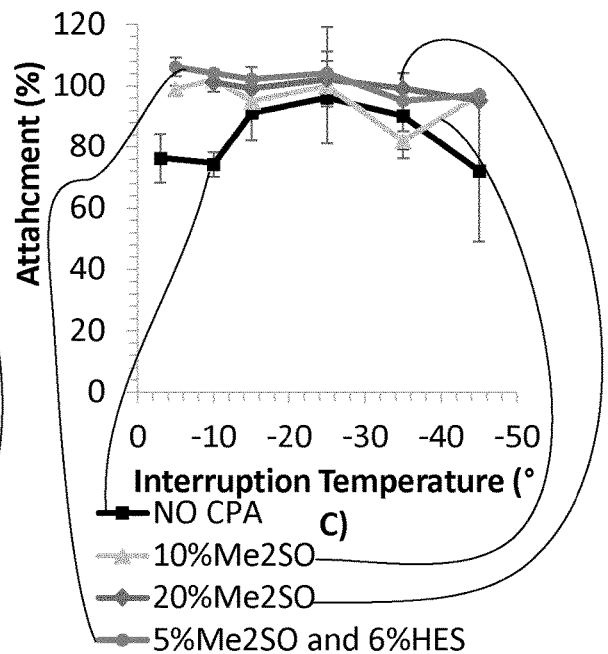

FIG. 6A shows that the relative and absolute viabilities were maintained after overnight incubation of the PCEC monolayers that have undergone slow cooling to −40° C. and liquid nitrogen storage. Moreover, viabilities were not affected by the rate of cooling (0.2° C./min vs. 1° C./min) nor by the manner by which the CPA was removed (single PBS wash vs. serial dilution). Moreover, FIG. 6B shows that the metabolic ability of the frozen PCEC monolayers incubated overnight post-thaw remained comparable to the unfrozen control and was also not affected by the manner by which the CPA was removed.

Significant progress towards the development of a protocol for the cryopreservation of cell monolayers was achieved through a systematic examination of factors that could influence post-thaw outcome. High membrane integrity obtained for both HUVECs and PCECs confirm that i) culturing cells on Rinzl™ plastic coverslips; ii) using a combination of penetrating CPA (5% DMSO) and a non-penetrating CPA (6% HES), iii) adding 2% CS to the CPA solution; and iv) controlled cooling at 0.2° C./min or 1° C./min contribute to an optimized protocol.

To our knowledge, this is the first report which shows that a substrate with a coefficient of thermal expansion close to that of ice improves viability after cryopreservation compared with glass as the substrate. The exact mechanism of the cryoprotective effect of the Rinzl™ substrate is not known. The extracellular matrix can be the first site of damage in the freezing of monolayers. Previous studies reported the reduction in surface area index of osteoblast cells in monolayers after cryopreservation due to disruption of actin filaments [29]. Since Rinzl™ [53] and ice [54] have close coefficients of thermal expansion ($6.0 \times 10^{-5}$/K and $5.1 \times 10^{-5}$/K, respectively, compared to glass [8] (between 0.3 and $0.9 \times 10^{-5}$/K)), actin filaments and/or extracellular matrix proteins such as fibronectin may experience less stress or structural damage caused by thermal mismatch during cooling and warming compared with cells on glass. Since size and shape of the ice are also determinant factors for cell viability, it is not known whether the amount, size, shape and location or propagation of ice in monolayers is equal for cells on glass and Rinzl™ coverslips. Importantly, the results of attachment studies (FIGS. 7A-7D) corroborate a preliminary finding by our group [46] that the use of Rinzl™ as a substrate rather than glass enhances attachment of cells in the absence of CPAs. However, a new finding in this work is that in the presence of appropriate CPAs, attachment to both substrates is very high. Therefore, attachment alone is not the reason for the improved viability seen in this cryopreservation study when Rinzl™ is used in combination with appropriately chosen cryoprotectants. Thus, Rinzl™ has an additional benefit in maintaining cell viability.

Previously we have shown that the combination of 5% DMSO and 6% HES is optimal for the cryopreservation of HUVECs in suspension [50]. Addition of polymeric CPAs like HES helps in drawing water out of cells at higher subzero temperatures and reduces the required concentration of penetrating CPAs (5% instead of 10% DMSO). By dehydrating the cells, HES mitigates damage due to intracellular ice formation; it also has the ability to stabilize the cell membrane and to bind water molecules and keep them in a vitrified state [49]. Here we found that high absolute viability immediately after thaw was attained in the presence of 5% DMSO and 6% HES if the CPA was not removed, but dropped significantly upon CPA removal. However, the addition of 2% CS to the CPA solution allowed the recovery of highly membrane-intact cells even after CPA removal. Chondroitin sulfate has been used for coating the surface to promote attachment of HUVECs to the substrate [51]. In fact, adhesion of different cell types to CS suggests the presence of putative receptors on the surface of cells [43]. Although the exact mechanism of action for its cryoprotective activity is not known, CS may act as a hydrogel by absorbing water [47], thereby preventing the direct interaction of extracellular ice with the plasma membrane during the freezing process and protecting the cells from the possible damage by extracellular ice. It has been proposed by others that the effect of CS in cryopreservation of porcine cornea could be attributed to modification of the kinetics of freezing, as they did not find the same degree of supercooling in a solution in the presence of CS compared with a solution in the presence of DMSO alone [19]. Chondroitin sulfate is a natural glycosaminoglycan present in corneal stroma believed to enhance adhesion to the Descemet's membrane [16]. It has been shown that corneal endothelial cell densities were optimally maintained when 2% CS was added to the cryopreservation medium for porcine corneas [19].

Although cells in monolayers are generally more susceptible to freezing injury than cells in suspension [5], here we confirm that HUVECs and PCECs are relatively tolerant to osmotic stress during slow cooling as had been shown for intact corneal endothelium [4], as well as for human corneal endothelial cells [14]. Slow cooling rates appear to be beneficial for cryopreserving monolayers. By cooling the immortalized human endothelial cell line (ECV304) as a confluent layer on microcarrier beads between 0.3 and 500° C./min, the recovery of attached cells was shown to increase from 45% at 10° C./min to 85% at 0.3° C./min [42]. Similarly, the best endothelial function and morphology of rabbit corneas frozen with 10% propane-1,2-diol was achieved after slow cooling at 0.2° C./min [45]. In our experiments cooling at 1° C./min or 0.2° C./min did not show statistically different results for both HUVECs and PCECs.

We examined the effect of CPA removal on viability immediately after thaw. The abrupt osmotic change during CPA removal by dilution can cause substantial cell swelling and ultimately lysis. The protocol developed here led to high viability of HUVECs and PCECs immediately after thaw and CPA removal. However, it is known that some damage may manifest after some time that is not evident immediately after thaw and CPA removal [9,15,20]. We found that upon removal of CPA the viability of PCEC monolayers remained high after overnight incubation (at least 12 hours). Furthermore, we found that the ability to metabolically reduce AlamarBlue™ of frozen PCEC monolayers incubated overnight post-thaw was comparable to that of unfrozen controls.

Our results present a significant advance in the cryopreservation of cell monolayers. In the short-term, cryopreserved vascular and corneal endothelial monolayers may find application in drug testing and disease modeling. In the future, corneal endothelial monolayers may be used in tissue-engineered constructs for transplantation [18,28].

Cryopreservation is a process by which biological materials (cells and tissues) are cooled down to cryogenic temperatures (such as the temperature of liquid nitrogen −196° C.), are maintained at this temperature for a long period of time and then thawed to resume their normal functions. At cryogenic temperature, all biological and chemical activities are stopped [34], [55], [7] allowing very long storage times. In order to minimize damage due to cryoinjury, the use of cryoprotectants (CPAs) in cryopreservation solutions was developed [56], [57], [58]. Dimethyl sulfoxide (DMSO) and hydroxyethyl starch (HES) are two examples of penetrating and non-penetrating cryoprotectants respectively.

In contrast to cell cryopreservation in suspension, cryopreservation of cells in a monolayer, a two-dimensional structure of closely packed cells attached to a substrate, has always been challenging and the cryopreservation protocol for cells in suspension is generally not applicable to cells in monolayers. Cryopreservation of monolayers of cultured human umbilical vein endothelial cells (HUVECs) are of interest as a model for cryopreservation of intact endothelial monolayers that cover the inner surface of blood vessels and also as a model for corneal endothelium.

Cryopreservation of human umbilical vein endothelial cells (HUVECs) in monolayers was studied leading to development of a protocol for cryopreservation of cells in monolayers. For this purpose, several different factors had to be considered.

This study showed that the substrate affects viability of HUVECs in cryopreservation. The best cryoprotectant solution for HUVECs in monolayer was a combination of 5%

DMSO, 6% HES and 2% chondroitin sulfate. A lower cooling rate of 0.2° C./min compared with 1° C./min resulted in higher viability for plunge-thaw samples for all experimental temperatures. While CPA removal is common after thawing, this study showed that CPA removal 24 hours after thaw resulted in higher viability for HUVECs compared with CPA removal immediately after thaw. This study showed that the highest viability after cryopreservation of HUVEC monolayers was achieved for cells cultured on Rinzl™ coverslips for 7 days, cooled at a rate of 0.2° C./min in the presence of 5% DMSO, 6% HES and 2% chondroitin sulfate, plunged into liquid nitrogen from
−45° C. and the CPA removal 24 hours after thawing. The relative and absolute viabilities for this protocol were 81.7±9.1% and 70.7±8.9% respectively. These cells can be used as a model for cryopreservation of intact monolayers that cover the inner surface of blood vessels and also as a model for corneal endothelium.

The one aim of this study was to compare the effect of two different substrates on HUVEC viability after freezing at −9° C. The dependent variable in this study was viability and the independent variable was the type of substrate (glass or Rinzl™). Three independent experiments were performed for both glass and Rinzl™ coverslips. For this purpose, the mean difference between HUVEC viability on glass and Rinzl™ coverslips (two populations) after freezing at (−9° C.) was evaluated by an independent samples t-test. These are the assumptions for this t-test:

1. independent observations,
2. normal distribution, and
3. homogeneity of variance (equal variance between two populations).

Three independent experiments were conducted for this study. Statistical analysis was performed by SPSS statistics version 24. Significance was accepted with $p<0.05$.

Figure 8:
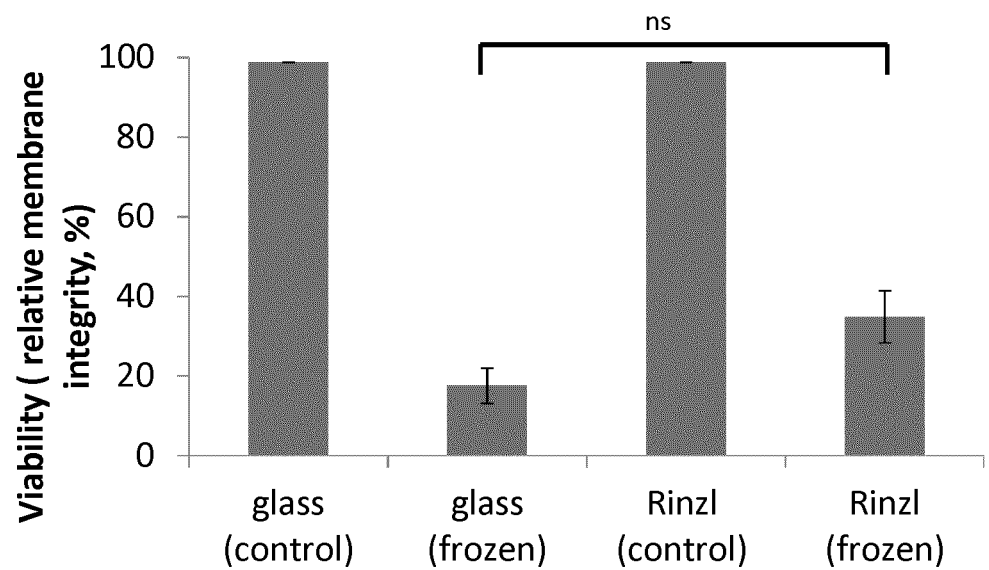
FIG. 8 shows a graph of HUVEC viability after freezing at −9° C. Coverslips were stained with SYTO13/GelRed™ and viability assessed under a fluorescent microscope using the Viability3 program. Each experiment was performed in triplicate and results are the average of three independent experiments. Data are mean±standard error of the mean (SEM). Statistical analysis was performed using the independent samples t-test. The level of significance was considered to be p<0.05. ns=no significant difference.
Figure 9:
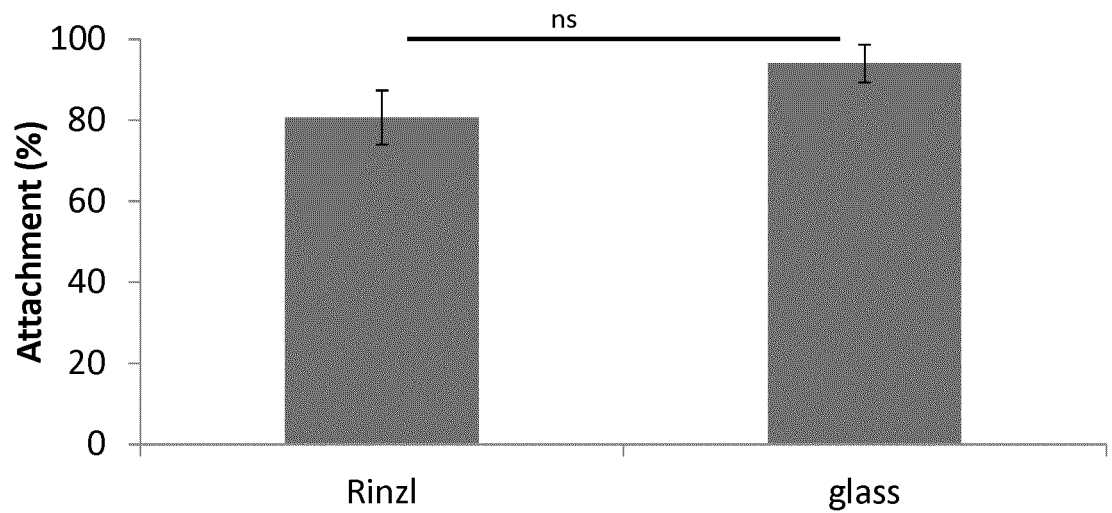
FIG. 9 shows a graph of HUVEC attachment after freezing at −9° C. on glass and Rinzl™ coverslips. Attachment was calculated based on the ratio of the total number of cells in each image to the total number of cells on a control coverslip. Data are mean±standard error of the mean (SEM). Data are the average of three independent experiments and in each experiment samples were triplicate. Statistical analysis was performed by the independent samples t-test. The level of significance was considered p<0.05. ns=no significant difference.

To assess the effect of the substrate on HUVEC viability and attachment, HUVECs were frozen at −9° C. on glass and Rinzl™ plastic coverslips on day 7 of culture. The coverslips were coated with fibronectin prior to cell seeding. Viability and attachment in this study are the average of three independent experiments and data are presented as mean±standard error of the mean (SEM). Comparison of HUVEC viability on glass and Rinzl™ coverslips showed that in the absence of freezing (unfrozen sample), there was no significant difference between cell viability on glass (98.7±0.04%) and Rinzl™ (98.8±0.06%) coverslips (FIG. 8). Controls were confluent monolayers and cells were completely attached to the surface. However, HUVEC viability was greatly affected after thawing on both glass and Rinzl™ coverslips and there was a dramatic drop in cell viability for cells on glass (viability was 17.5±7.6%) (FIG. 8). HUVEC response to freezing on Rinzl™ coverslips was accompanied by a reduction in viability to 34.8±11.3% (FIG. 8). The difference between viability on glass and Rinzl™ was not statistically significant (p=0.09). In addition to viability, cell attachment was also affected by freezing. Attachment is the ratio of total cells (red and green) on frozen coverslips to total cells in control (before freezing). HUVECs were detached from both frozen glass and Rinzl™ coverslips compared with control. Comparison of HUVEC attachment on frozen glass (94±8%) and Rinzl™ (80±11%) coverslips showed no significant difference (p=0.18) (FIG. 9). Although the viability dramatically decreased, a cell adhesion assessment showed that in fact most of the cells remained attached on both types of coverslips after freezing.

Figure 10:
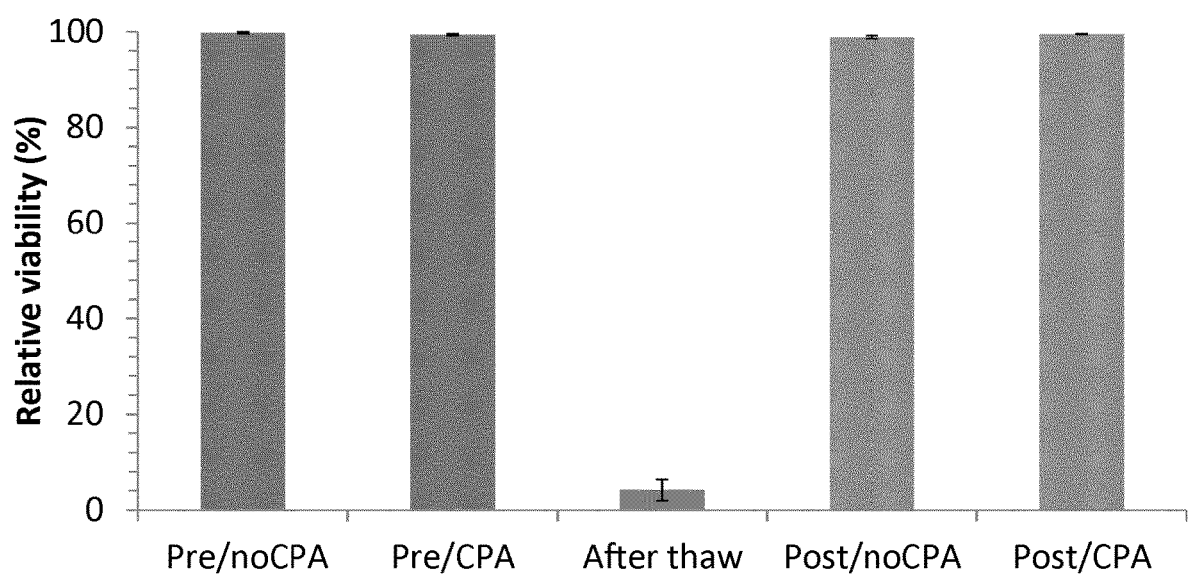
FIG. 10 shows a graph of CPA removal for HUVECs on Rinzl™ coverslips (cryoprotectant solution was prepared in CryoStor and consisted of 5% DMSO and 6% HES in CryoStor). Pre-experiment controls were incubated in the absence and presence of CPA for 15 minutes and assessed for viability. HUVECs were plunged into liquid nitrogen from −45° C. thawed rapidly in a 37° C. water bath and assessed for viability before CPA removal. Post-experiment controls in the absence and presence of CPA were assessed for viability. Results are the average of three independent experiments. Data are presented as mean±standard error of the mean (SEM).

FIG. 10 shows results of CPA removal for HUVECs on Rinzl™ coverslips (cryoprotectant solution was prepared in CryoStor™ and consisted of 5% DMSO and 6% HES in CryoStor™). Pre-experiment controls were incubated in the absence and presence of CPA for 15 minutes and assessed for viability. HUVECs were plunged into liquid nitrogen from −45° C. thawed rapidly in a 37° C. water bath and assessed for viability before CPA removal. Post-experiment controls in the absence and presence of CPA were assessed for viability. Results are the average of three independent experiments. Data are presented as mean±standard error of the mean (SEM).

Chondroitin sulfate (CS) is one the major components of extracellular matrix and has been extensively used for tissue engineering as a scaffold [64]. The presence of chondroitin sulfate A has been reported on the surface of HUVECs, and it is proposed that cell adhesion in vivo is mediated by chondroitin sulfate chains, which link to thrombomodulin (TD). TD is an integral protein, which is expressed on the surface of endothelial cells [43].

Chondroitin sulfate has been used in cryopreservation solutions. A study by Proulx et al. showed that the presence of 0.08% CS in a culture medium for pig cornea endothelium helped cells to be tightly packed and had a beneficial effect on overall morphology in culture [65]. Viability assessment after cryopreservation of porcine corneal endothelium in the presence of different concentrations of chondroitin sulfate (0, 2, 5, 10, and 20%) in fetal calf serum with a cooling rate of 1° C./min showed higher cell survival in the presence of 2% CS compared with the controls, which was accompanied by high morphological integrity [19]. This result was not restricted to immediately after the thawing process. Another study by Hagenah et al. confirmed that endothelium cryopreserved in the presence of 2% CS also had higher integrity in post-thaw culture after cryopreservation. Cells preserved in the presence of CS only showed 33% loss of viability while cells cryopreserved in the absence of CS showed 73% loss of viability [20]. The exact mechanism of CS function on endothelial cells is unknown; however, several studies have mentioned its beneficial effect on endothelial cell growth. CS has shown a growth stimulating effect on human corneal endothelial cells [66]. The addition of chondroitin sulfate has also shown a beneficial effect for vitrification of intact human articular cartilage; addition of chondroitin sulfate to the vitrification solution led to an increase in cell recovery from 52.4% to 75.4% [22].

In this experiment, HUVECs were subjected to graded freezing in the presence of 2% CS, 5% DMSO and 6% HES. Chondroitin sulfate A (CHS-A) (C8529, Sigma-Aldrich) used in this experiment was extracted from bovine trachea and it is in the form of sodium salt (storage temperature 2-8° C.).

In order to assess the effect of chondroitin sulfate on cell viability during cryopreservation, chondroitin sulfate was added to the cryopreservation solution. In this experiment, HUVECs on Rinzl™ coverslip were frozen in the presence of 2% w/w chondroitin sulfate, 5% w/w DMSO, and 6% w/w HES in EGM-2 medium (cryoprotectant solution was prepared in double concentration as a stock solution) and added 1:1 to each glass vial. On day 7, HUVEC monolayers were frozen according to the graded freezing protocol (1° C./min). For this experiment, two coverslips were considered for pre-experiments (sample 1 was in the absence of CPA, and sample 2 was in the presence of CPA) and were assessed after 15 minutes incubation on ice. Three coverslips were subjected to graded freezing (1° C./min). These coverslips were plunged into liquid nitrogen from −45° C. for one hour and then thawed in a water bath at 37° C. One coverslip (sample 3) was assessed immediately after thaw.

(Since it was not possible to capture an image of a Rinzl™ coverslip in the presence of chondroitin sulfate, 500 µl of PBS was added to the vial after thaw and after 1 minute, the solution was removed. 190 µl of PBS was added to the vial and HUVECs were stained with Syto13/GelRed™ and observed under a fluorescent microscope for viability (Sample 3)). For the second coverslip (sample 4), cryoprotectants were removed by serial dilution as described before and cells were stained with Syto13/GelRed™. Viability was assessed using the Viability3 program. For the third coverslip (sample 5), the same procedure was repeated and after serial dilution, the coverslip was transferred with fine tweezers from the glass vial to a well in a 24-well plate containing 500 µl of growth medium supplemented with penicillin and incubated in a humidified incubator at 37° C. and 5% $CO_2$. After 24 hours, the coverslip was stained with Syto13/GelRed™ and assessed for viability (Sample 5). Samples 6 and 7 were coverslips in the presence on CPA incubated on ice for the duration of experiment for which no freezing had occurred. Sample 6 was assessed for viability before CPA removal. Sample 7 was assessed after CPA removal by serial dilution. Sample 8 was a coverslip, which after CPA serial dilution was incubated in incubator with 500 µl of EGM-2 and assessed for viability 24 hours after CPA removal. Data are presented as mean±standard error of the mean (SEM). Results are the average of three independent experiments.

The aim of this study was developing a cryopreservation protocol for cells in monolayers. This aim was achieved by considering different factors: i) HUVEC culture on two different substrates over a period of 10 days, assessing cell morphology, viability and achieving a growth curve which resulted in considering a confluent monolayer of viable HUVECs on day 7 for cryopreservation studies; ii) comparison of the effect of substrates on cell viability and attachment; iii) comparison of the effect of absence or presence and composition of cryoprotectants in the cryopreservation solution for cell viability and iv) further optimization in terms of CPA removal, cooling rate and presence of chondroitin sulfate in the cryopreservation solution. As hypothesized, HUVEC viability was affected by the type of substrate both in the presence or absence of cryoprotectants during cryopreservation. A comparison of viability in the absence of cryoprotectants showed that Rinzl™ could provide protection to cells in plunge-thaw samples compared with glass (maximum viability in the absence of cryoprotectants was (45.4±7.9% and 2.33±0.89% on Rinzl™ and glass coverslips respectively). This protection was higher in the presence of cryoprotectants (10% and 20% DMSO) compared with HUVECs on glass in the presence of 10% and 20% DMSO. However, attachment was not affected by the type of the substrate during cryopreservation of HUVEC monolayers.

This study showed that the cryoprotective effect of DMSO was better in the presence of HES and that a combination of 5% DMSO and 6% HES led to higher viability on Rinzl™ coverslips compared with 10% and 20% DMSO for HUVECs in monolayers at a cooling rate of 1° C./min. While achieving high cell recovery immediately after thaw is essential, it does not necessarily guarantee viability of the cells after 24 hours of post-thaw culture. Cryopreservation at a lower cooling rate (0.2° C./min) and in the presence of 2% chondroitin sulfate in a cryopreservation solution in addition to 5% DMSO and 6% HES led to very high viability at all experimental temperatures. Cryoprotectant removal 24 hours after thaw dramatically increased viability of HUVECs in monolayers compared with other methods that were used in this study (Table 3). Therefore, cryopreservation in the presence of 5% DMSO, 6% HES and 2% chondroitin sulfate at a cooling rate of 0.2° C./min on Rinzl™ coverslips with CPA removed by serial dilution 24 hours after thaw was the best protocol in this study for cryopreservation of HUVECs in monolayers resulting in a relative viability of 81.7±9.1% and an absolute viability of 70.7±8.9% after CPA removal.

TABLE 3

Summary of experiments on Rinzl ™ coverslips for developing a cryopreservation protocol for HUVECs in monolayers

| Rinzl ™e coverslip (1° C./min) | Maximum relative viability % (Maximum absolute viability, %) | | | |
|---|---|---|---|---|
| | Immediately after thaw | After CPA removal | 24 hours after CPA removal | CPA removal after 24 hours |
| No CPA | 45.4 ± 7.9 (42.7 ± 6.5) | N/A | N/A | N/A |
| 10% DMSO | 46 ± 15 (42.48 ± 13.1) | N/A | N/A | N/A |
| 20% DMSO | 49.7 ± 11.2 (45.0 ± 6.1) | N/A | N/A | N/A |
| 5% DMSO + 6% HES | 79.6 ± 1.5 (79.7 ± 4.8) | 18.9 ± 9.4 (10.4 ± 8.3) | N/A | N/A |
| 5% DMSO + 6% HES + CryoStor | 4.2 ± 2.2 (3.86 ± 3.67) | N/A | N/A | N/A |
| 5% DMSO + 6% HES + 2% chondroitin sulfate | *99.6 ± 0.1 (80.0 ± 12.5) | 96.6 ± 2.0 (95.0 ± 1.2) | 0.65 ± 0.12 (0.6 ± 0.2) | N/A |
| 5% DMSO + 6% HES + 2% chondroitin sulfate (0.2° C./min) | *98.5 ± 1.0 (95.6 ± 21.1) | 93.3 ± 3.1 (92.1 ± 3.2) | 0.92 ± 0.37 (0.8 ± 0.5) | 81.7 ± 9.1 (70.71 ± 8.90) |

*Since it was not possible to capture an image of a Rinzl ™ coverslip in the presence of chondroitin sulfate after thaw, 500 µl of PBS was added to the vial after thaw and after 1 minute, the solution was removed. 190 µl of PBS was added to the vial and HUVECs were stained with Syto13/GelRed ™ and observed under a fluorescent microscope for viability.

HUVEC growth rates on fibronectin-coated glass and Rinzl coverslips were assessed over a period of 10 days after cell seeding. Three coverslips were assessed for viability per day. Staining was performed 4 hours after cell seeding for day 0. Viability and cell density calculations were based on images acquired with a resolution of 1280×1024 under the fluorescent microscope. A further image was taken by bright field microscopy (magnification also 10×) to calculate the area which covered the capture resolution. This resolution covers the surface area of one square of a hemocytometer. The surface area of this square is equal to 1 mm$^2$.

The data showed that HUVECs had high viability on both types of substrate over a period of 10 days (Tables 4 and 5). The growth pattern, cell morphology and maturation (differentiation to cobblestone phenotype) of HUVECs were also monitored daily by phase contrast microscopy. As the cells became confluent, they got remarkably smaller in size and packed tightly together (day 6 to day 10 compared to the first 5 days). Comparison of cell density showed that there was an increase in the number of the cells within the first 24 hours on both glass and Rinzl™ coverslips, which shows that HUVECs have a very short lag phase (a few hours) and started proliferation within the first 24 hours. Analysis of the growth rates revealed an increase in doubling number from day 1 to day 5 that shows rapid proliferation. The plateau phase is characterized by no significant difference in cell density from day 5 to day 10 on glass and Rinzl™ plastic coverslips. Kinetics of cell growth (doubling number) over the final 6 days showed that the rate of growth was very slow or negligible.

TABLE 4

Cell density, relative viability and doubling number for HUVECs cultured on fibronectin-coated glass coverslips

| Day | Cell number/mm$^2$ | Viability (%) | Doubling number | Cell growth |
|---|---|---|---|---|
| 0 | 116 ± 4 | 96.03 ± 3.2 |  | Lag phase |
| 1 | 191 ± 11 | 98.81 ± 2.3 | 0.7 | Exponential |
| 2 | 431 ± 13 | 98.80 ± 0.9 | 1.9 | phase |
| 3 | 702 ± 96 | 98.90 ± 1.2 | 2.6 |  |
| 4 | 1137 ± 78 | 98.2 ± 0.5 | 3.3 |  |
| 5 | 1270 ± 59 | 98.60 ± 0.2 | 3.45 | Plateau phase |
| 6 | 1252 ± 13 | 99.04 ± 0.7 | 3.43 |  |
| 7 | 1379 ± 49 | 95.16 ± 0.7 | 3.57 |  |
| 8 | 1270 ± 102 | 97.33 ± 3.9 | 3.45 |  |

TABLE 4-continued

Cell density, relative viability and doubling number for HUVECs cultured on fibronectin-coated glass coverslips

| Day | Cell number/mm$^2$ | Viability (%) | Doubling number | Cell growth |
|---|---|---|---|---|
| 9 | 1307 ± 15 | 97.4 ± 0.3 | 3.49 |  |
| 10 | 1418 ± 38 | 92.9 ± 3.6 | 3.6 |  |

TABLE 5

Cell density, relative viability and doubling number for HUVECs cultured on fibronectin-coated Rinzl™ coverslips

| Day | Cell number/mm$^2$ | Viability (%) | Doubling number | Cell growth |
|---|---|---|---|---|
| 0 | 96 ± 11 | 96.0 ± 2.1 |  | Lag phase |
| 1 | 179 ± 11 | 98.8 ± 0.3 | 0.9 | Exponential |
| 2 | 348 ± 49 | 98.8 ± 0.3 | 1.85 | phase |
| 3 | 540 ± 117 | 98.9 ± 0.2 | 2.5 |  |
| 4 | 1002 ± 54 | 98.2 ± 0.2 | 3.38 |  |
| 5 | 1108 ± 45 | 98.6 ± 0.1 | 3.52 | Plateau phase |
| 6 | 1226 ± 29 | 99.0 ± 0.3 | 3.67 |  |
| 7 | 1390 ± 6 | 95.1 ± 1.3 | 3.85 |  |
| 8 | 1216 ± 59 | 97.3 ± 1.4 | 3.66 |  |
| 9 | 1282 ± 57 | 97.4 ± 1.2 | 3.73 |  |
| 10 | 1322 ± 51 | 92.9 ± 3.3 | 3.78 |  |

For the experiments in the absence or presence of cryoprotectants, positive controls consisted of unfrozen glass coverslips which were assessed after 15 min incubation on ice; negative controls were samples plunged into liquid nitrogen after 15 min incubation on ice which at the end of the experiments were thawed and assessed for viability. The results are the average of three independent experiments (N=3). Cell viability was also assessed for different experimental conditions on Rinzl™ coverslips. Controls for any experimental conditions were in the absence or presence of cryoprotectants (pre-experiments). Post-experiments were coverslips which were assessed after the last direct-thaw sample was thawed. These samples were also in the absence or presence of cryoprotectants and were incubated on ice for the duration of experiments.

TABLE 6

Relative viability of HUVEC controls cultured on fibronectin-coated glass coverslips for graded freezing experiments in the absence or presence of cryoprotectants (positive controls are unfrozen coverslips, and negative controls were plunged into liquid nitrogen directly after 15 min incubation on ice in the absence or presence of cryoprotectants).

| Control Glass coverslip | Positive controls | | | | Negative controls | |
|---|---|---|---|---|---|---|
|  | Pre-exp No CPA | Pre-exp CPA | Post-exp No CPA | Post-exp CPA | Plunge No CPA | Plunge CPA |
| No CPA | 98.6 ± 0.3 | N/A | 99.4 ± 0.2 | N/A | 0.4 ± 0.3 | N/A |
| 10% Me$_2$SO | 99.4 ± 0.2 | 99.4 ± 0.4 | 99.0 ± 0.3 | 97.2 ± 1.0 | 0.4 ± 0.3 | 6.3 ± 2.1 |
| 20% Me$_2$SO | 99.1 ± 0.4 | 97.2 ± 0.7 | 99.2 ± 0.1 | 97.9 ± 0.4 | 1.4 ± 1.2 | 10.6 ± 3.6 |
| 5% Me$_2$SO, 6% HES | 99.2 ± 0.3 | 99.1 ± 0.1 | 98.7 ± 0.3 | 99.1 ± 0.3 | 0.9 ± 0.3 | 1.0 ± 0.3 |

TABLE 7

Relative viability of HUVEC controls cultured on fibronectin-coated Rinzl ™ coverslips for graded freezing experiments in the absence or presence of cryoprotectants (positive controls are unfrozen coverslips and negative controls were plunged into liquid nitrogen directly after 15 min incubation on ice in the absence or presence of cryoprotectants).

| Control Rinzl coverslip | Positive controls | | | | Negative controls | |
|---|---|---|---|---|---|---|
| | Pre-exp No CPA | Pre-exp CPA | Post-exp No CPA | Post-exp CPA | Plunge No CPA | Plunge CPA |
| No CPA | 98.3 ± 0.6 | N/A | 98.3 ± 0.2 | N/A | 1.1 ± 0.6 | N/A |
| 10% $Me_2SO$ | 99.1 ± 0.3 | 97.7 ± 0.6 | 98.1 ± 0.4 | 92.7 ± 1.2 | 1.2 ± 0.6 | 15.4 ± 6.5 |
| 20% $Me_2SO$ | 98.7 ± 0.3 | 99.2 ± 0.2 | 98.9 ± 0.2 | 96.8 ± 1.4 | 3.1 ± 2.9 | 19.4 ± 4.6 |
| 5% $Me_2SO$, 6% HES | 95.3 ± 3.6 | 98.7 ± 0.2 | 99.2 ± 0.2 | 99.1 ± 0.3 | 0.9 ± 0.3 | 14.4 ± 2.2 |

TABLE 8

Relative viability (pre-experiment and post-experiment controls) of HUVECs on fibronectin-coated Rinzl ™ coverslips for different experimental conditions.

| Controls Experimental conditions | Pre-exp (No CPA) | Pre-exp (CPA) | Post-exp (No CPA) | Post-exp (CPA) | Post-exp (CPA serial dilution) |
|---|---|---|---|---|---|
| 5% $Me_2SO$, 6% HES (cooling rate: 1° C./min) | 99.4 ± 0.1 | 99.7 ± 0.1 | 98.6 ± 0.3 | 99.3 ± 0.2 | 98.7 ± 0.4 |
| 5% $Me_2SO$, 6% HES, 2% CS (cooling rate: 1° C./min) | 99.7 ± 0.0 | 99.2 ± 0.1 | 98.1 ± 0.1 | 97.2 ± 1.2 | 99.6 ± 0.1 |
| 5% $Me_2SO$, 6% HES, 2% CS (cooling rate: 0.2° C./min) | 98.4 ± 0.5 | 97.1 ± 2.5 | 98.1 ± 1.0 | 99.2 ± 0.05 | 99.3 ± 0.05 (serial dilution after 24 hours) |

Data are the result of three independent experiments and are presented as mean ± standard error of the mean.

TABLE 9

Degrees of freedom, p-values and t-values for independent samples t-test (two-tailed) for comparison of maximum absolute viability of HUVECs on Rinzl ™ or glass coverslips for different experimental conditions. Significance level was considered to be p = 0.05. Statistical analysis was performed with IBM SPSS Statistics 24 or Microsoft Excel ™.

| Experimental condition | Degrees of freedom | p-value | t-value |
|---|---|---|---|
| No CPA Glass vs. Rinzl | 4 | 0.06 | 2.52 |
| 10% $Me_2SO$ Glass vs. Rinzl | 4 | 0.06 | 2.56 |
| 20% $Me_2SO$ Glass vs. Rinzl | 3 | 0.04 | 3.35 |
| 5% $Me_2SO$ and 6% HES Glass vs. Rinzl | 2 | 0.004 | 16.84 |
| 5% $Me_2SO$, 6% HES, 2% CS (1° C./min, Rinzl) vs. 5% $Me_2SO$, 6% HES (1° C./min, Rinzl) | 5 | 0.1 | 1.76 |
| 5% $Me_2SO$, 6% HES, 2% CS (1° C./min, Rinzl) vs. 5% $Me_2SO$, 6% HES, 2% CS (0.2° C./min, Rinzl) | 9 | 0.8 | 0.22 |

The freezing and thawing process may interfere with the adhesion of the monolayer on the substrate, or cause structural damage to the monolayer and cause it to detach. The % attachment is calculated from the ratio of the total number of cells on an experimental coverslip to the total number of cells on a pre-experiment control (unfrozen) coverslip (FIGS. 7A-7D).

Cryopreservation and Post-Thaw Assessment of Brain Microvascular Endothelial Cell Monolayers Human cerebral microvascular endothelial cells/D3 clone (hCMEC/D3 cell line, CLU512, CELLutions™ Biosystems Inc., Burlington, ON, Canada) were purchased as cryopreserved cells in 5% dimethyl sulfoxide and 95% fetal bovine serum (FBS). The cells were shipped in dry ice, immediately transferred to liquid nitrogen upon receipt, and rapidly thawed in a 37° C. water bath prior to plating.

The hCMEC/D3 cells were cultured in endothelial basal media (190860, Lonza) supplemented with 5% FBS (10270-106, Life Technologies), 1.4 µM hydrocortisone (H0135, Sigma), 5 µg/mL ascorbic acid (A4544, Sigma), 1% chemically defined lipid concentrate (Ser. No. 11/905,031, Life Technologies), 10 mM HEPES (15630-080, Life Technologies) and 1 ng/mL bFGF (F0291, Sigma), on CellBind™ flasks (Corning, CLS3290) in a humidified incubator at 37° C. and 5% CO2. The media was changed every 3 to 4 days until the cells reached ~80% confluence. hCMEC/D3 cells were harvested by addition 0.25% trypsin-EDTA (IX, 25200, Gibco™, Fisher Scientific) and incubation at 37° C. for 2-3 minutes. Trypsinization was arrested by adding serum-containing media, and then centrifuged at 10000 rpm for 10 min, resuspended in media and seeded onto fibronectin-covered Rinzl™ coverslips as described previously (Eskandari et al., 2018).

The cells were allowed to reach confluence and then the cell monolayers on Rinzl™ were transferred to glass vials. Cryoprotectant (5% DMSO+6% HES+2% CS) was added to the cell monolayers kept on ice for 15 min and then equilibrated to −5° C. in a methanol bath. Ice nucleation was induced at −5° C. by touching the glass vial with metal forceps cooled in liquid nitrogen and further incubated at −5° C. to release the latent heat of fusion. Controlled slow cooling (1° C./min) was carried out until −40° C., after which the glass vials were transferred to liquid nitrogen for storage. Rapid thaw was performed in a 37° C. water bath. The cryoprotectant was removed using a single PBS wash. The cell monolayers were immediately stained with SYTO13/GelRed™™ and imaged for membrane integrity immediately or after overnight incubation in media as previously described (Eskandari et al., 2018).

For functional assessments, cell monolayers were stained for the tight junction proteins ZO-1 and claudin-5 immediately after thaw as previously described (Marquez-Curtis, McGann and Elliott, 2017). Briefly, cell monolayers were fixed, followed by blocking with 3% bovine serum albumin (BSA, Sigma) for at least an hour at room temperature. Fluorochrome-conjugated antibodies were incubated with the cell monolayer overnight at 4° C. The antibody was removed and the monolayer washed three times with PBS and imaged with a fluorescent microscope (Leitz, Dialux 22).

In addition, Alamar Blue™ reduction assay was carried out immediate after thaw (same day) and after overnight incubation. 20 μL of AlamarBlue™ reagent (Invitrogen, Life Technologies Inc., Eugene, OR, USA) was added to 200 μL of media covering the monolayers and the samples were incubated for 4 h at 37° C. Absorbance was measured at 570 nm using 600 nm as a reference wavelength (SpectraMax™ Plus, Molecular Devices, San Jose, CA, USA). The percent reduction of AlamarBlue™ was calculated as per manufacturer's instructions with corrections applied for no-cell controls.

Figure 11:
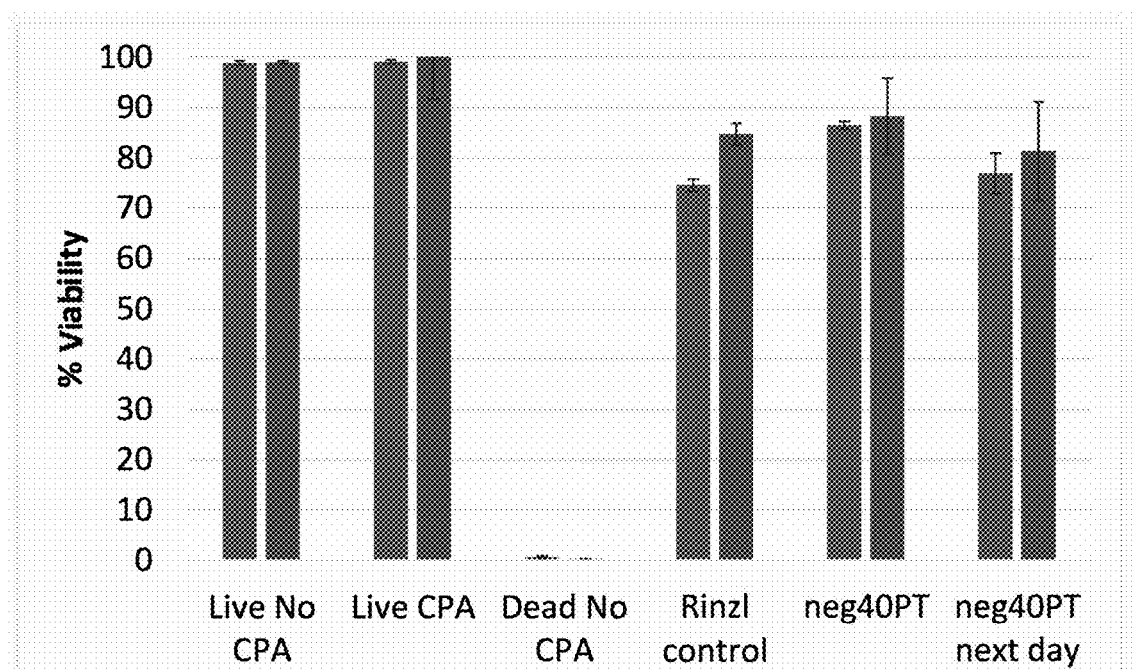
FIG. 11 shows a graph of relative (left side bar of each pair of bars) and absolute (right side bar of each pair of bars) viabilities of human cerebral microvascular endothelial cell (hCMEC) monolayers on fibronectin-coated coverslips. Viabilities of unfrozen monolayers in the absence (Live No CPA) or presence of 5% DMSO, 6% HES and 2% CS (Live CPA) and monolayers directly plunged into liquid nitrogen with (Rinzl control) or without CPA (Dead No CPA) and after cooling at 1° C./min to −40° C. in the presence of 5% DMSO, 6% HES and 2% CS, plunging and storage in liquid nitrogen, rapid thaw in a 37° C. water bath, and immediate cryoprotectant removal with a single wash using PBS, and assessment on same day (labelled neg40PT) or after overnight incubation (labelled neg40PT next day). Cell membrane integrity in each captured image was quantified using Viability3 automated cell counting software. Data represent the mean of three independent experiments±standard error of the mean.

FIG. 11 is a graph of relative (left side bar of each pair of bars) and absolute (right side bar of each pair of bars) viabilities of hCMEC monolayers on fibronectin-coated coverslips after cooling at 1° C./min to −40° C. in the presence of 5% DMSO, 6% HES and 2% CS, plunging and storage in liquid nitrogen, rapid thaw in a 37° C. water bath, and immediate cryoprotectant removal with a single wash using PBS(labelled neg40PT). Cell membrane integrity in each captured image was quantified using Viability3 automated cell counting software. Data represent the mean of three independent experiments±standard error of the mean.

Figure 12:
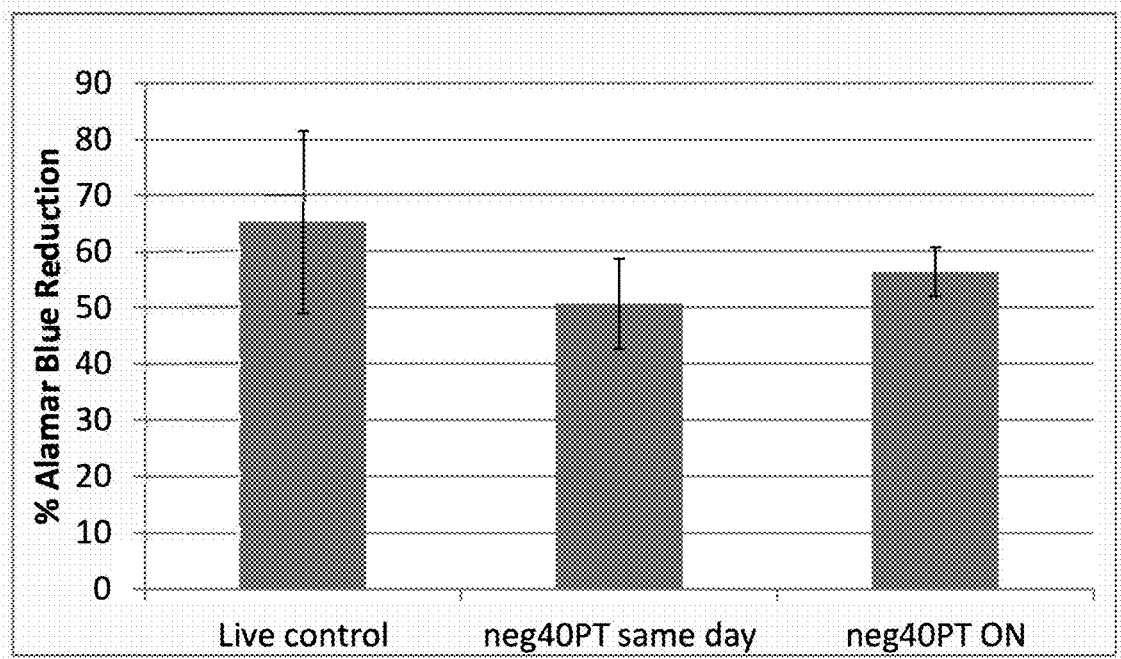
FIG. 12 shows a graph of metabolic activity of hCMEC monolayers on fibronectin-coated coverslips after cooling at 1° C./min to −40° C. in the presence of 5% DMSO, 6% HES and 2% CS, plunging and storage in liquid nitrogen, rapid thaw in a 37° C. water bath, and immediate cryoprotectant removal with a single wash using PBS (labelled neg40PT). The Alamar Blue reduction assay was carried out on the same day post-thaw or after overnight (ON) incubation at 37° C. in media and compared with live unfrozen control. Data represent the mean of three independent experiments±standard error of the mean.

FIG. 12 is a graph of metabolic activity of hCMEC monolayers on fibronectin-coated coverslips after cooling at 1° C./min to −40° C. in the presence of 5% DMSO, 6% HES and 2% CS, plunging and storage in liquid nitrogen, rapid thaw in a 37° C. water bath, and immediate cryoprotectant removal with a single wash using PBS. The Alamar Blue™ reduction assay was carried out on the same day post-thaw (labelled neg40PT same day) or after overnight (labelled neg40PT ON) incubation at 37° C. in media. Data represent the mean of three independent experiments±standard error of the mean.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

REFERENCES

[1] J. P. Acker, J. A. W. Elliott, L. E. McGann, Intercellular ice propagation: experimental evidence for ice growth through membrane pores, Biophys J. 81 (2001) 1389-1397.

[2] J. P. Acker, A. Larese, H. Yang, A. Petrenko, L. E. McGann, Intracellular ice formation is affected by cell interactions, Cryobiology. 38 (1999) 363-371.

[3] J. P. Acker, L. E. McGann, Protective effect of intracellular ice during freezing?, Cryobiology. 46 (2003) 197-202.

[4] J. Armitage, Cryopreservation for corneal storage, Dev Ophthalmol. 43 (2009) 63-69.

[5] W. J. Armitage, B. K. Juss, The influence of cooling rate on survival of frozen cells differs in monolayers and in suspensions, Cryo-Letters. 17 (1996) 213-218.

[6] A. Asari, S. Miyauchi, T. Takahashi, K. Kohno, Y. Uchiyama, Localization of hyaluronic acid, chondroitin sulfate, and CD44 in rabbit cornea, Arch Histol Cytol. 55 (1992) 503-511.

[7] J. Bakhach, The cryopreservation of composite tissues: Principles and recent advancement on cryopreservation of different type of tissues, Organogenesis. 5 (2009) 119-126.

[8] N. P. Bansal, R. H. Doremus, Handbook of Glass Properties, Elsevier, 1986.

[9] J. M. Baust, R. V. A. N. Buskirk, J. G. Baust, Cell viability improves following inhibition of cryopreservation-induced apoptosis, Vitr Cell Dev Biol—Anim. 36 (2000) 262-270.

[10] J. Birraux, B. Genin, D. Matthey-Doret, R. Mage, P. Morel, C. Le Coultre, Hepatocyte cryopreservation in a three-dimensional structure, Transplant Proc. 34 (2002) 764-767.

[11] K. G. M. Brockbank, Effects of cryopreservation upon vein function in vivo, Cryobiology. 31 (1994) 71-81.

[12] H. E. Broxmeyer, E. F. Srour, G. Hangoc, S. Cooper, S. A. Anderson, D. M. Bodine, High-efficiency recovery of functional hematopoietic progenitor and stem cells from human cord blood cryopreserved for 15 years, Proc Natl Acad Sci. 100 (2003) 645-650.

[13] P. F. Costa, A. F. Dias, R. L. Reis, M. E. Gomes, Cryopreservation of cell/scaffold tissue-engineered constructs, Tissue Eng Part C Methods. 18 (2012) 852-858.

[14] S. L. Ebertz, L. E. McGann, Cryoinjury in endothelial cell monolayers, Cryobiology. 49 (2004) 37-44.

[15] N. Eskandari, Developing a cryopreservation protocol for human umbilical vein endothelial cells (HUVECs) in monolayers. MSc Thesis, 2017.

[16] W. X. Fan, X. H. Ma, D. Ge, T. Q. Liu, Z. F. Cui, Cryoprotectants for the vitrification of corneal endothelial cells, Cryobiology. 58 (2009) 28-36.

[17] V. Gouliarmou, O. Pelkonen, S. Coecke, Differentiation-promoting medium additives for hepatocyte cultivation and cryopreservation, Methods Mol Biol. 1250 (2015) 143-159.

[18] M. Griffith, E. I. Alarcon, I. Brunette, Regenerative approaches for the cornea, J Intern Med. 12502 (2016) 1-11.

[19] M. Hagenah, M. Bohnke, Corneal cryopreservation with chondroitin sulfate, Cryobiology. 30 (1993) 396-406.

[20] M. Hagenah, M. Böhnke, Latent endothelial cell damage after experimental corneal cryopreservation, Graefe's Arch Clin Exp Ophthalmol. 231 (1993) 529-532.

[21] T. H. Jang, S. C. Park, J. H. Yang, J. Y. Kim, J. H. Seok, U. S. Park, C. W. Choi, S. R. Lee, J. Han, Cryopreservation and its clinical applications, Integr Med Res. 6 (2017) 12-18.

[22] N. M. Jomha, J. A. W. Elliott, G. K. Law, B. Maghdoori, J. F. Forbes, A. Abazari, A. B. Adesida, L. Laouar, X. Zhou, L. E. McGann, Vitrification of intact human articular cartilage, Biomaterials. 33 (2012) 6061-8.

[23] H. Kim, S. Tanaka, S. Une, M. Nakaichi, S. Sumida, Y. Taura, A comparative study of the effects of glycerol and hydroxyethyl starch in canine red blood cell cryopreservation, J Vet Med Sci. 66 (2004) 1133-1134.

[24] H. G. Koebe, J. C. Y. Dunn, M. Toner, L. M. Sterling, A. Hubei, E. G. Cravalho, M. L. Yarmush, R. G. Tompkins, A new approach to the cryopreservation of hepatocytes in a sandwich culture configuration, Cryobiology. 27 (1990) 576-584.

[25] M. Kubo, K. Ando, T. Mimura, Y. Matsusue, K. Mori, Chondroitin sulfate for the treatment of hip and knee osteoarthritis: Current status and future trends, Life Sci. 85 (2009) 477-483.

[26] L. Lecchi, S. Giovanelli, B. Gagliardi, I. Pezzali, I. Ratti, M. Marconi, An update on methods for cryopreservation and thawing of hemopoietic stem cells, Transfus Apher Sci. 54 (2016) 324-336.

[27] K. Lehle, M. Hoenicka, V. R. Jacobs, F. X. Schmid, D. E. Birnbaum, Cryopreservation of human endothelial cells for vascular tissue engineering, Cryobiology. 50 (2005) 154-161.

[28] H. Levis, A. Kureshi, I. Massie, L. Morgan, A. Vernon, J. Daniels, Tissue engineering the cornea: The evolution of RAFT, J Funct Biomater. 6 (2015) 50-65.

[29] B. L. Liu, J. McGrath, L. McCabe, M. Baumann, Cellular response of murine osteoblasts to cryopreservation: the influence of attachment to hydroxyapatite (HA) scaffolds, African J Biotechnol. 5 (2006) 2014-2019.

[30] P. W. Madden, M. J. Taylor, C. J. Hunt, D. E. Pegg, The effect of polyvinylpyrrolidone and the cooling rate during corneal cryopreservation, Cryobiology. 30 (1993) 135-157.

[31] L. A. Marquez-Curtis, A. Janowska-Wieczorek, L. E. McGann, J. A. W. Elliott, Mesenchymal stromal cells derived from various tissues: Biological, clinical and cryopreservation aspects, Cryobiology. 71 (2015) 181-197.

[32] L. A. Marquez-Curtis, L. E. McGann, J. A. W. Elliott, Expansion and cryopreservation of porcine and human corneal endothelial cells, Cryobiology. 77 (2017) 1-13.

[33] J. Martel-Pelletier, S. Kwan Tat, J. P. Pelletier, Effects of chondroitin sulfate in the pathophysiology of the osteoarthritic joint: a narrative review, Osteoarthr Cartil. 18 (2010) S7-S11.

[34] M. Maruyama, T. Kenmochi, K. Sakamoto, S. Arita, C. Iwashita, H. Kashiwabara, Simplified method for cryopreservation of islets using hydroxyethyl starch and dimethyl sulfoxide as cryoprotectants, in: Transplant Proc, 2004: pp. 1133-1134.

[35] P. Mazur, Freezing of living cells: mechanisms and implications, Am J Physiol. 247 (1984) C125-C142.

[36] P. Mazur, S. P. Leibo, E. H. Chu, A two-factor hypothesis of freezing injury. Evidence from Chinese hamster tissue-culture cells, Exp Cell Res. 71 (1972) 345-55.

[37] L. E. McGann, Optimal temperature ranges for control of cooling rate, Cryobiology. 16 (1979) 211-216.

[38] D. F. McGinnity, M. G. Soars, R. A. Urbanowicz, R. J. Riley, Evaluation of fresh and cryopreserved hepatocytes as in vitro drug metabolism tools for the prediction of metabolic clearance, Drug Metab Dispos. 32 (2004) 1247-1253.

[39] Y. Miyamoto, S. Enosawa, T. Takeuchi, T. Takezawa, Cryopreservation in situ of cell monolayers on collagen vitrigel membrane culture substrata: Ready-to-use preparation of primary hepatocytes and ES cells, Cell Transplant. 18 (2009) 619-626.

[40] Y. Naaldijk, M. Staude, V. Fedorova, A. Stolzing, Effect of different freezing rates during cryopreservation of rat mesenchymal stem cells using combinations of hydroxyethyl starch and dimethylsulfoxide, BioMed Cent Biotechnol. 12 (2012) 1-10.

[41] D. E. Pegg, Viability assays for preserved cells, tissues, and organs, CryoLetters. 26 (1989) 212-231.

[42] D. E. Pegg, Cryopreservation of vascular endothelial cells as isolated cells and as monolayers, Cryobiology. 44 (2002) 46-53.

[43] S. J. Rogerson, S. C. Chaiyaroj, K. Ng, J. C. Reeder, G. V Brown, Chondroitin sulfate A is a cell surface receptor for Plasmodium falciparum-infected erythrocytes, J Exp Med. 182 (1995) 15-20.

[44] L. U. Ross-Rodriguez, J. A. W. Elliott, L. E. McGann, Investigating cryoinjury using simulations and experiments: 2. TF-1 cells during graded freezing (interrupted slow cooling without hold time), Cryobiology. 61 (2010) 46-51.

[45] C. Routledge, W. J. Armitage, Cryopreservation of cornea: a low cooling rate improves functional survival of endothelium after freezing and thawing, Cryobiology. 46 (2003) 277-283.

[46] T. Rutt, N. Eskandari, M. Zhurova, J. A. W. Elliott, L. E. McGann, J. P. Acker, J. A. Nychka, Thermal expansion of substrate may affect adhesion of Chinese hamster fibroblasts to surfaces during freezing, Cryobiology. 86 (2019) 134-139

[47] R. Servaty, J. Schiller, H. Binder, K. Arnold, Hydration of polymeric components of cartilage—An infrared spectroscopic study on hyaluronic acid and chondroitin sulfate, Int J Biol Macromol. 28 (2001) 121-127.

[48] P. J. Stiff, M. F. DeRisi, A. Langleben, S. Gulati, A. Koester, V. Lanzotti, B. D. Clarksont, Autologous bone marrow transplantation using unfractionated cells without rate-controlled freezing in hydroxyethyl starch and dimethyl sulfoxide, Ann N Y Acad Sci. 411 (1983) 378-380.

[49] A. Stolzing, Y. Naaldijk, V. Fedorova S. Sethe, Hydroxyethylstarch in cryopreservation—Mechanisms, benefits and problems, Transfus Apher Sci. 46 (2012) 137-147.

[50] A. B. Sultani, L. A. Marquez-Curtis, J. A. W. Elliott, L. E. McGann, Improved cryopreservation of human umbilical vein endothelial cells: A systematic approach, Sci Rep. 6 (2016) 1-14.

[51] P. K. Thalla, H. Fadlallah, B. Liberelle, P. Lequoy, G. De Crescenzo, Y. Merhi, S. Lerouge, Chondroitin sulfate coatings display low platelet but high endothelial cell adhesive properties favorable for vascular implants, Biomacromolecules. 15 (2014) 2512-2520.

[52] M. Zhurova, E. J. Woods, J. P. Acker, Intracellular ice formation in confluent monolayers of human dental stem cells and membrane damage, Cryobiology. 61 (2011) 133-141.

[53] http://app.knovel.com/hotlink/toc/id:kpUPPPPVS1/ullmanns-polymers-plastics/ullmanns-polymers-plastics, Accessed Jun. 20, 2017.

[54] http://www.its.caltech.edu/~atomic/snowcrystals/ice/ice.htm, Accessed Jun. 20, 2017.

[55] P. Mazur, Cryobiology: The freezing of biological systems, Science. 168 (1970) 939-949. doi:10.1126/science.168.3934.939.

[56] L. E. McGann, M. L. Walterson, Cryoprotection by dimethyl sulfoxide and dimethyl sulfone, Cryobiology. 24 (1987) 11-16. doi:10.1016/0011-2240(87)90003-4

[57] F. E. De Leeuw, A. M. De Leeuw, J. H. Den Daas, B. Colenbrander, A. J. Verkleij, Effects of various cryoprotective agents and membrane-stabilizing compounds on bull sperm membrane integrity after cooling and freezing., Cryobiology. 30 (1993) 32-44. doi:10.1006/cryo.1993.1005.

[58] J. F. Carpenter, J. H. Crowe, The mechanism of cryoprotection of proteins by solutes, Cryobiology. 25 (1988) 244-255. doi:10.1016/0011-2240(88)90032-6.

[59] P. Mazur, The role of intracellular freezing in the death of cells cooled at supraoptimal rates., Cryobiology. 14 (1977) 251-272. doi:10.1016/0011-2240(77)90175-4.

[60] P. Mazur, W. F. Rall, S. P. Leibo, Kinetics of water loss and the likelihood of intracellular freezing in mouse ova—Influence of the method of calculating the temperature dependence of water permeability, Cell Biophys. 6 (1984) 197-213. doi:10.1007/BF02788619.

[61] B. Liu, J. McGrath, Freezing osteoblast cells attached to hydroxyapatite discs and glass coverslips: Mechanisms of damage, Sci. China, Ser. E Technol. Sci. 50 (2007) 248-256. doi:10.1007/s11431-007-0021-5.

[62] D. E. Pegg, M. P. Diaper, On the mechanism of injury to slowly frozen erythrocytes, Biophys. J. 54 (1988) 471-488. doi:10.1016/s0006-3495(88)82980-1.

[63] Toner M., Cravalho E. G., Karel M. Thermodynamics and kinetics of intracellular ice formation during freezing of biological cells. J. Appl. Phys. 67(1990) 1582-1593.

[64] J. Y. Lai, Corneal stromal cell growth on gelatin/chondroitin sulfate scaffolds modified at different NHS/EDC molar ratios, Int. J. Mol. Sci. 14 (2013) 2036-2055. doi:10.3390/ijms14012036.

[65] S. Proulx, J.-M. Bourget, N. Gagnon, S. Martel, A. Deschambeault, P. Carrier, C. J. Giasson, F. A. Auger, I. Brunette, L. Germain, Optimization of culture conditions for porcine corneal endothelial cells., Mol. Vis. 13 (2007) 524-533.

[66] B. Y. J. T. Yue, J. Sugar, J. E. Gilboy, J. L. Elvarr, Growth of human corneal endothelial cells in vitro., Invest. Ophthalmol. Vis. Sci. 30 (1989) 248-253.

The invention claimed is:

1. A method for cryopreservation of cells in an aqueous medium, wherein the cells are adhered to a substrate, comprising:
cooling the cells in the presence of a cryopreservative to freeze the medium and convert water to ice
wherein the cryopreservative comprises DMSO, HES and CS.

2. The method of claim 1 in which the cryopreservative comprises about 5% DMSO, about 6% HES, and about 2% CS by weight.

3. The method of claim 1 in which the cryopreservative comprises 3% or more DMSO, 4% or more HES, and 1% or more CS by weight.

4. A method for cryopreservation of cells in an aqueous medium, wherein the cells are adhered to a substrate, comprising:
cooling the cells in the presence of a cryopreservative to freeze the medium and convert water to ice, the ice having a coefficient of thermal expansion;
wherein the substrate has a coefficient of thermal expansion between $10 \times 10^{-6}$/K and $500 \times 10^{-6}$/K; and
wherein the cryopreservative comprises dimethyl sulfoxide (DMSO), hydroxyethyl starch (HES) and chondroitin sulfate (CS).

5. The method of claim 4 in which the cells comprise endothelial cells.

6. The method of claim 5 in which the cells comprise corneal endothelial cells.

7. The method of claim 5 in which the cells comprise human umbilical vein endothelial cells.

8. The method of claim 4 in which the cells comprise vascular cells.

9. The method of claim 4 in which the cells comprise one or a combination of endothelial cells, fibroblasts, epithelial cells, mesenchymal stromal cells, stem cells, hepatocytes, osteoblasts, muscle cells, cardiomyocytes, glial cells, neuronal cells, cells from tissue, cells from islets of Langerhans, testicular cells, ovarian cells, and cells in organoids.

10. The method of claim 4 in which the cells are cooled at a rate between 0.2° C./min and 3° C./min.

11. The method of claim 4 in which the cells are cooled at a rate between 0.2° C./min and 1° C./min.

12. The method of claim 4 in which the cells are cooled at a rate between 0.2° C./min and 5° C./min.

13. The method of claim 4 in which the substrate comprises vinyl polymer.

14. The method of claim 13 in which the substrate comprises a vinyl polymer coverslip.

15. The method of claim 4 in which the cells are in a single layer.

16. The method of claim 4 in which all cells contact the substrate.

17. The method of claim 4 in which some cells are in contact with the substrate and other cells are in contact with those cells.

18. The method of claim 4 in which the cryopreservative comprises two or more permeating cryoprotectants, one of the two or more permeating cryoprotectants comprising DMSO.

19. The method of claim 18 in which at least one of the permeating cryoprotectants is selected from a group of glycerol, propylene glycol, ethylene glycol, formamide, ethanol and methanol.

20. The method of claim 4 in which the cryopreservative comprises two or more non-permeating cryoprotectants, one of the two or more non-permeating cryoprotectants comprising HES.

21. The method of claim 20 in which the non-permeating cryoprotectants are selected from a group of sugars, starches, proteins, serum, plasma or other macromolecules.

22. The method of claim 4 in which the cryopreservative comprises 5% DMSO, 6% HES and 2% CS by weight.

23. The method of claim 4 in which the aqueous medium comprises a cell culture medium.

24. The method of claim 4 in which the aqueous medium comprises an aqueous buffer selected from the group consisting of phosphate-buffered saline, Hank's balanced salt solution or 4-(2-hydroxyethyl)-1-piperazineethanesulfonic acid (HEPES).

25. The method of claim 5 in which the cells comprise human cerebral microvascular endothelial cells.

26. The method of claim 4 in which the substrate is coated with fibronectin.

27. The method of claim 4 in which the substrate is coated with collagen, laminin or another cell-attachment-enhancing component.

28. The method of claim 4 in which the substrate is selected from a group consisting of polytetrafluoroethylene, polymethylmethacrylate, acrylic, polylactic acid, polylactide, polyethylene naphthalate, polycyclohexane dimethyl terephthalate glycol (PCTG), poly (1,4-cyclohexylene dimethylene terephthalate-co-isophthalate) (PCTA), polyallyldiglycol carbonate, polycarbonate, polycarbonate+polybutylene terephthalate, polyethylene terephthalate, polyethylene terephthalate glycol, polycarbonate+polyester, polydimethyl siloxane, vinylmethyl silicone, perfluoropolyethers, thermoset polyester, cellulose acetate butyrate, polypropylene flame retarded, polypropylene impact copolymer UV stabilized, thermoplastic vulcanizate, thermoplastic elastomer ether-ester, thermoplastic polyurethane elastomer, cyclic olefin polymer (COP), cyclic olefin copolymer (COC), methylmethacrylate acrylonitrile butadiene styrene, polymethylpentene, polyethersulfone, polyphenylsulfone, acrylonitrile methyl acrylate copolymer, polyether block amide, thermoplastic amide, ethylene vinyl acetate, polyvinyl butyral, polyvinylchloride elastomer, styrene butadiene styrene block copolymer, polylactic-co-glycolic acid (PLGA), poly (vinyl alcohol)-methacrylate (PVMA).

29. The method of claim 4 in which the cryopreservative comprises 3% or more DMSO, 4% or more HES, and 1% or more CS by weight.

30. A method for cryopreservation of cells in an aqueous medium, wherein the cells are adhered to a substrate, comprising:
    cooling the cells in the presence of a cryopreservative to freeze the medium and convert water to ice, the ice having a coefficient of thermal expansion;
    wherein the substrate has a coefficient of thermal expansion that is between $10 \times 10^{-6}$/K and $70 \times 10^{-6}$/K; and
    wherein the cryopreservative comprises DMSO, HES and CS.

* * * * *